United States Patent
Shimizu et al.

(10) Patent No.: US 10,827,548 B2
(45) Date of Patent: Nov. 3, 2020

(54) EFFICIENT BEAM TRACKING FOR VEHICULAR MILLIMETER WAVE COMMUNICATION

(71) Applicant: TOYOTA JIDOSHA KABUSHIKI KAISHA, Toyota-shi, Aichi-ken (JP)

(72) Inventors: Takayuki Shimizu, Mountain View, CA (US); Gaurav Bansal, Mountain View, CA (US)

(*) Notice: Subject to any disclaimer, the term of this patent is extended or adjusted under 35 U.S.C. 154(b) by 63 days.

(21) Appl. No.: 16/165,006

(22) Filed: Oct. 19, 2018

(65) Prior Publication Data
US 2020/0128597 A1   Apr. 23, 2020

(51) Int. Cl.
    H04W 76/15   (2018.01)
    H04W 4/029   (2018.01)
    H04W 4/40    (2018.01)

(52) U.S. Cl.
    CPC ......... *H04W 76/15* (2018.02); *H04W 4/029* (2018.02); *H04W 4/40* (2018.02)

(58) Field of Classification Search
    CPC ....... H04W 76/15; H04W 4/029; H04W 4/40; H04W 76/10; H04W 76/20; H04W 76/25; H04W 4/02; H04W 4/025; H04W 4/46; H04W 4/48
    See application file for complete search history.

(56) References Cited

U.S. PATENT DOCUMENTS

| | | | |
|---|---|---|---|
| 10,098,014 B1* | 10/2018 | Shimizu | H04B 7/0617 |
| 10,341,931 B1* | 7/2019 | Apostolopoulos | H04W 40/20 |
| 10,530,451 B1* | 1/2020 | Bansal | H04W 64/006 |
| 2014/0292090 A1* | 10/2014 | Cordeiro | H02J 50/27 307/104 |
| 2016/0007355 A1* | 1/2016 | Cordeiro | H04B 7/0617 370/329 |
| 2017/0299689 A1* | 10/2017 | Va | G01S 5/0252 |
| 2018/0049154 A1* | 2/2018 | Choi | H04W 76/10 |

(Continued)

FOREIGN PATENT DOCUMENTS

| JP | PO2014-530535 | 11/2014 |
|---|---|---|
| JP | PO2014-531852 | 11/2014 |

OTHER PUBLICATIONS

Va et al., "Position-Aided Millimeter Wave V2I Beam Alignment: A Learning-to-Rank Approach," Personal, Indoor, and Mobile Radio Communications (PIMRC), 2017 IEEE 28th Annual International Symposium on. IEEE, 2017, 5 pages.

*Primary Examiner* — Kevin D Mew
(74) *Attorney, Agent, or Firm* — Burbage Law P.C.; Jon-Michael Burbage; Elizabeth Ruzich

(57) ABSTRACT

The disclosure includes embodiments for providing efficient beam tracking for millimeter wave (mmWave) communication beam alignment between a vehicle and another endpoint. In some embodiments, a method includes executing an initial beam alignment process to establish an initial mmWave link setup with an endpoint so that a first mmWave communication process is performed with the endpoint. The method includes determining whether a second mmWave link setup is needed to perform a second mmWave communication process with the endpoint. Responsive to determining that the second mmWave link setup is needed, the method includes executing a limited beam alignment process to establish the second mmWave link setup so that an amount of time needed to establish the second mmWave link setup is minimized.

20 Claims, 13 Drawing Sheets

(56) References Cited

U.S. PATENT DOCUMENTS

| | | | |
|---|---|---|---|
| 2018/0123751 A1* | 5/2018 | Narasimha | H04W 24/08 |
| 2018/0159607 A1* | 6/2018 | Rybakowski | H04B 7/0617 |
| 2019/0132807 A1* | 5/2019 | Abedini | H04W 52/34 |
| 2019/0132847 A1* | 5/2019 | Abedini | H04W 72/0473 |
| 2019/0238658 A1* | 8/2019 | Shimizu | H04W 4/80 |
| 2019/0239040 A1* | 8/2019 | Va | H04W 4/46 |
| 2019/0373631 A1* | 12/2019 | Gulati | H04W 72/1278 |

* cited by examiner

US 10,827,548 B2

EFFICIENT BEAM TRACKING FOR VEHICULAR MILLIMETER WAVE COMMUNICATION

BACKGROUND

The specification relates to providing efficient beam tracking for millimeter wave (mmWave) communication beam alignment between a vehicle and an endpoint.

Radio waves in an Extremely High Frequency ("EHF") band (e.g., about 28 to 300 gigahertz ("GHz")) have wavelengths from ten to one millimeter and are consequently referred to as millimeter waves ("mmWave" or "mmWaves"). A challenge in mmWave communication includes beam alignment. The mmWave communication between two endpoints is not possible without first completing a beam alignment process between these two endpoints. For example, beamforming with narrow beams is needed to compensate high propagation loss at the mmWave band and appropriate beam pointing at both a receiver and a transmitter is needed. It is currently difficult or impossible to implement mmWave communication in vehicles because existing technologies cannot complete a beam alignment process in a timely fashion that is sufficiently quick for vehicular applications. For example, vehicles travel quickly on roadways, and if an endpoint for a mmWave communication is a vehicle (or worse yet, both endpoints for an mmWave communication are vehicles), then it is needed to execute a beam alignment process in a very short amount of time.

However, no existing solution works in the real-world for vehicular applications. For example, an existing solution for beam alignment is known as "beam training by beam sweeping." This solution is not adequate for vehicle applications because it is designed for low mobility environments and does not work for high mobility environments such as present in vehicle applications.

In vehicular mmWave communication, a fast beam alignment between a transmitter and a receiver is needed due to high mobility of the vehicles. Existing beam alignment solutions based on beam sweeping are not suitable to track high-speed movements of the vehicles. Some beam alignment solutions are useful to establish mmWave communication between vehicles and infrastructures in line-of-sight (LOS) and non-line-of-sight (NLOS) scenarios using a Learning-to-Rank (LtR) approach. However, these solutions need several beam trainings and do not utilize temporal correlation of previously used beams. It is not efficient to perform the same procedure in every mmWave communication after an initial mmWave link is setup.

SUMMARY

Described are embodiments of a beam alignment reduction system installed in an electronic control unit (ECU) of a vehicle. The beam alignment reduction system is operable to provide more efficient beam tracking for mmWave communication beam alignment between the vehicle and an endpoint so that mmWave communication can be implemented between the vehicle and the endpoint.

In some embodiments, the beam alignment reduction system is operable to use one or more of Vehicle-to-Everything (V2X) data and vehicle sensor data to conduct an initial beam alignment process for the vehicle so that a first mmWave communication is exchanged with a particular endpoint (this "endpoint" may or may not be another vehicle). As a result of this initial beam alignment process, an initial mmWave link setup is established so that the first mmWave communication occurs between the vehicle and the endpoint. The V2X data includes digital data describing a speed, a location and optionally a path history of the endpoint and is transmitted via one or more of the following types of V2X communication that do not include mmWave (i.e., a non-mmWave type of V2X communication): Dedicated Short Range Communication (DSRC) (including Basic Safety Messages (BSMs) and Pedestrian Safety Messages (PSMs), among other types of DSRC communication); Long-Term Evolution to V2X (LTE-V2X); LTE to Vehicle-to-Infrastructure (LTE-V21); LTE-Vehicle-to-Vehicle (LTE-V2V); LTE-Device-to-Device (LTE-D2D); Voice over LTE (VoLTE); 5G-V2X; ITS-G5 in Europe; ITS-Connect; and any other type of V2X communication that does not include mmWave (because, for example, mmWave is not possible without a beam alignment procedure achieved by the beam alignment reduction system described herein).

The beam alignment reduction system described herein does not perform a complete beam re-alignment process for a second mmWave communication that may occur with the same endpoint as the first mmWave communication. By comparison, existing solutions always perform a complete beam re-alignment process for any second mmWave communications without utilizing temporal correlation of previously used beams, even when they occur with the same endpoint. This difference between existing solutions and the beam alignment reduction system described herein saves a significant amount of time and makes the beam alignment reduction system more appropriate for vehicular applications compared to existing solutions.

After a decision is made to execute a second mmWave communication with the same endpoint that was the subject of the first mmWave communication, the beam alignment reduction system described herein first executes a process to determine whether a second mmWave link setup is actually needed. However, no existing solution considers whether or not a second mmWave link setup is actually needed.

If no second mmWave link setup is needed, then the beam alignment reduction system saves time by not executing any beam re-alignment steps prior to initiating the second mmWave communication with the endpoint.

If a second mmWave link setup is needed, then the beam alignment reduction system executes a limited beam alignment process that is configured to minimize the time needed to establish the second mmWave link setup. This limited beam alignment process is configured to utilize a result of the initial beam alignment process to reduce the number of beam pairs that are trained, i.e., instead of completing a complete beam re-alignment process, the beam alignment reduction system only trains a limited number of beam pairs around one or more beam pairs that are selected in the initial beam alignment process.

In existing solutions, when a second mmWave communication needs to occur, an entire new beam alignment process is executed. This is very time consuming and contributes to the time constraints that make mmWave communication currently unsuitable for vehicular applications. By comparison, the beam alignment reduction system described herein saves time by collecting and analyzing mmWave-centric measurements and forgoing the creation of a new mmWave link if one is not needed based on an analysis result of the mmWave-centric measurements. No existing solution considers mmWave-centric measurements for determination of whether a second mmWave link setup is needed for the second mmWave communication to occur.

If a second mmWave link setup is needed, then the beam alignment reduction system still saves time when compared to existing solutions by utilizing prior results of the initial beam alignment process to limit the number of beam pairs that are considered when performing a beam alignment process for the second mmWave link setup. No existing solution considers the results of previous beam alignment processes to limit the number of beam pairs that are considered for a next beam alignment process.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method for a vehicle, including: executing an initial beam alignment process to establish an initial millimeter wave (mmWave) link setup with an endpoint so that a first mmWave communication process is performed with the endpoint; determining whether a second mmWave link setup is needed to perform a second mmWave communication process with the endpoint; and responsive to determining that the second mmWave link setup is needed, executing a limited beam alignment process to establish the second mmWave link setup so that an amount of time needed to establish the second mmWave link setup is minimized. Other embodiments of this aspect include corresponding computer systems, apparatus, and computer programs recorded on one or more computer storage devices, each configured to perform the actions of the methods.

Implementations may include one or more of the following features. The method further including: responsive to determining that the second mmWave link setup is not needed, performing the second mmWave communication process with the endpoint without establishing the second mmWave link setup so that the amount of time needed to establish the second mmWave link setup is saved. The method where determining whether the second mmWave link setup is needed includes: determining whether the second mmWave link setup is needed based on a set of mmWave-centric measurements. The method where determining whether the second mmWave link setup is needed based on the set of mmWave-centric measurements further includes: determining the set of mmWave-centric measurements since the first mmWave communication process is performed; analyzing the set of mmWave-centric measurements to generate an analysis result; and determining whether the second mmWave link setup is needed based on the analysis result. The method where the set of mmWave-centric measurements includes one or more of: an mmWave signal strength associated with the initial mmWave link setup; a distance that the endpoint has traveled since the first mmWave communication process is performed; a speed of the endpoint; and a change on a relative position between the vehicle and the endpoint. The method where executing the limited beam alignment process to establish the second mmWave link setup further includes: completing the limited beam alignment process based on a setup result of the initial mmWave link setup so that the amount of time needed to establish the second mmWave link setup is substantially reduced compared to an amount of time needed to establish the initial mmWave link setup. The method where completing the limited beam alignment process based on the setup result of the initial mmWave link setup further includes: retrieving selected beam data describing one or more selected beam pairs from the setup result of the initial mmWave link setup, where the one or more selected beam pairs are used between the vehicle and the endpoint to complete the first mmWave communication process; and training a limited number of beam pairs around the one or more selected beam pairs to establish the second mmWave link setup. The method where: each of the one or more selected beam pairs includes a selected vehicle-side beam lobe and a selected endpoint-side beam lobe; the limited number of beam pairs includes beam pairs formed by a list of vehicle-side beam lobes and a list of endpoint-side beam lobes; the list of vehicle-side beam lobes includes the selected vehicle-side beam lobe and one or more vehicle-side beam lobes next to the selected vehicle-side beam lobe; and the list of the endpoint-side beam lobes includes the selected endpoint-side beam lobe and one or more endpoint-side beam lobes next to the selected endpoint-side beam lobe. The method where a total number of beam pairs in the limited number of beam pairs is less than a total number of beam pairs trained during the initial mmWave link setup. The method where executing the initial beam alignment process to establish the initial mmWave link setup with the endpoint further includes: retrieving one or more of Vehicle-to-Everything (V2X) data from a non-mmWave type V2X wireless message received from the endpoint and sensor data from one or more sensors of the vehicle; and executing the initial beam alignment process based on the one or more of the V2X data and the sensor data. The method where executing the initial beam alignment process based on the one or more of the V2X data and the sensor data further includes: determining a location and a speed of the endpoint based on the one or more of the V2X data and the sensor data; estimating a future location of the endpoint based on the location and the speed of the endpoint; and sweeping a beam of an mmWave communication unit of the vehicle based on the future location of the endpoint to align the beam of the mmWave communication unit of the vehicle with the endpoint so that the initial mmWave link setup is established, where a setup result of the initial mmWave link setup includes selected beam data describing one or more selected beam pairs. Implementations of the described techniques may include hardware, a method or process, or computer software on a computer-accessible medium.

One general aspect includes a system including an onboard vehicle computer system including a non-transitory memory storing computer code which, when executed by the onboard vehicle computer system, causes the onboard vehicle computer system to: execute an initial beam alignment process to establish an initial millimeter wave (mmWave) link setup with an endpoint so that a first mmWave communication process is performed with the endpoint; determine whether a second mmWave link setup is needed to perform a second mmWave communication process with the endpoint; and responsive to determining that the second mmWave link setup is needed, execute a limited beam alignment process to establish the second mmWave link setup so that an amount of time needed to establish the second mmWave link setup is minimized. Other embodiments of this aspect include corresponding computer systems, apparatus, and computer programs recorded on one or more computer storage devices, each configured to perform the actions of the methods.

Implementations may include one or more of the following features. The system where the computer code which, when executed by the onboard vehicle computer system, causes the onboard vehicle computer system further to: responsive to determining that the second mmWave link setup is not needed, perform the second mmWave communication process with the endpoint without establishing the second mmWave link setup so that the amount of time needed to establish the second mmWave link setup is saved. The system where the computer code which, when executed by the onboard vehicle computer system, causes the onboard vehicle computer system to determine whether the second mmWave link setup is needed at least by: determining a set of mmWave-centric measurements since the first mmWave communication process is performed; analyzing the set of mmWave-centric measurements to generate an analysis result; and determining whether the second mmWave link setup is needed based on the analysis result. The system where the set of mmWave-centric measurements includes one or more of: an mmWave signal strength associated with the initial mmWave link setup; a distance that the endpoint has traveled since the first mmWave communication process is performed; a speed of the endpoint; and a change on a relative position between the vehicle and the endpoint. The system where the computer code which, when executed by the onboard vehicle computer system, causes the onboard vehicle computer system to execute the limited beam alignment process at least by: completing the limited beam alignment process based on a setup result of the initial mmWave link setup so that the amount of time needed to establish the second mmWave link setup is substantially reduced compared to an amount of time needed to establish the initial mmWave link setup. The system where the computer code which, when executed by the onboard vehicle computer system, causes the onboard vehicle computer system to complete the limited beam alignment process based on the setup result of the initial mmWave link setup at least by: retrieving selected beam data describing one or more selected beam pairs from the setup result of the initial mmWave link setup, where the one or more selected beam pairs are used between the vehicle and the endpoint to complete the first mmWave communication process; and training a limited number of beam pairs around the one or more selected beam pairs to establish the second mmWave link setup. The system where: each of the one or more selected beam pairs includes a selected vehicle-side beam lobe and a selected endpoint-side beam lobe; the limited number of beam pairs includes beam pairs formed by a list of vehicle-side beam lobes and a list of endpoint-side beam lobes; the list of vehicle-side beam lobes includes the selected vehicle-side beam lobe and one or more vehicle-side beam lobes next to the selected vehicle-side beam lobe; and the list of the endpoint-side beam lobes includes the selected endpoint-side beam lobe and one or more endpoint-side beam lobes next to the selected endpoint-side beam lobe. Implementations of the described techniques may include hardware, a method or process, or computer software on a computer-accessible medium.

One general aspect includes a computer program product including a non-transitory memory of an onboard vehicle computer system of a vehicle storing computer-executable code that, when executed by a processor, causes the processor to: execute an initial beam alignment process to establish an initial millimeter wave (mmWave) link setup with an endpoint so that a first mmWave communication process is performed with the endpoint; determine whether a second mmWave link setup is needed to perform a second mmWave communication process with the endpoint; and responsive to determining that the second mmWave link setup is needed, execute a limited beam alignment process to establish the second mmWave link setup so that an amount of time needed to establish the second mmWave link setup is minimized. Other embodiments of this aspect include corresponding computer systems, apparatus, and computer programs recorded on one or more computer storage devices, each configured to perform the actions of the methods.

Implementations may include one or more of the following features. The computer program product where the computer-executable code that, when executed by the processor, causes the processor further to: responsive to determining that the second mmWave link setup is not needed, perform the second mmWave communication process with the endpoint without establishing the second mmWave link setup so that the amount of time needed to establish the second mmWave link setup is saved. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
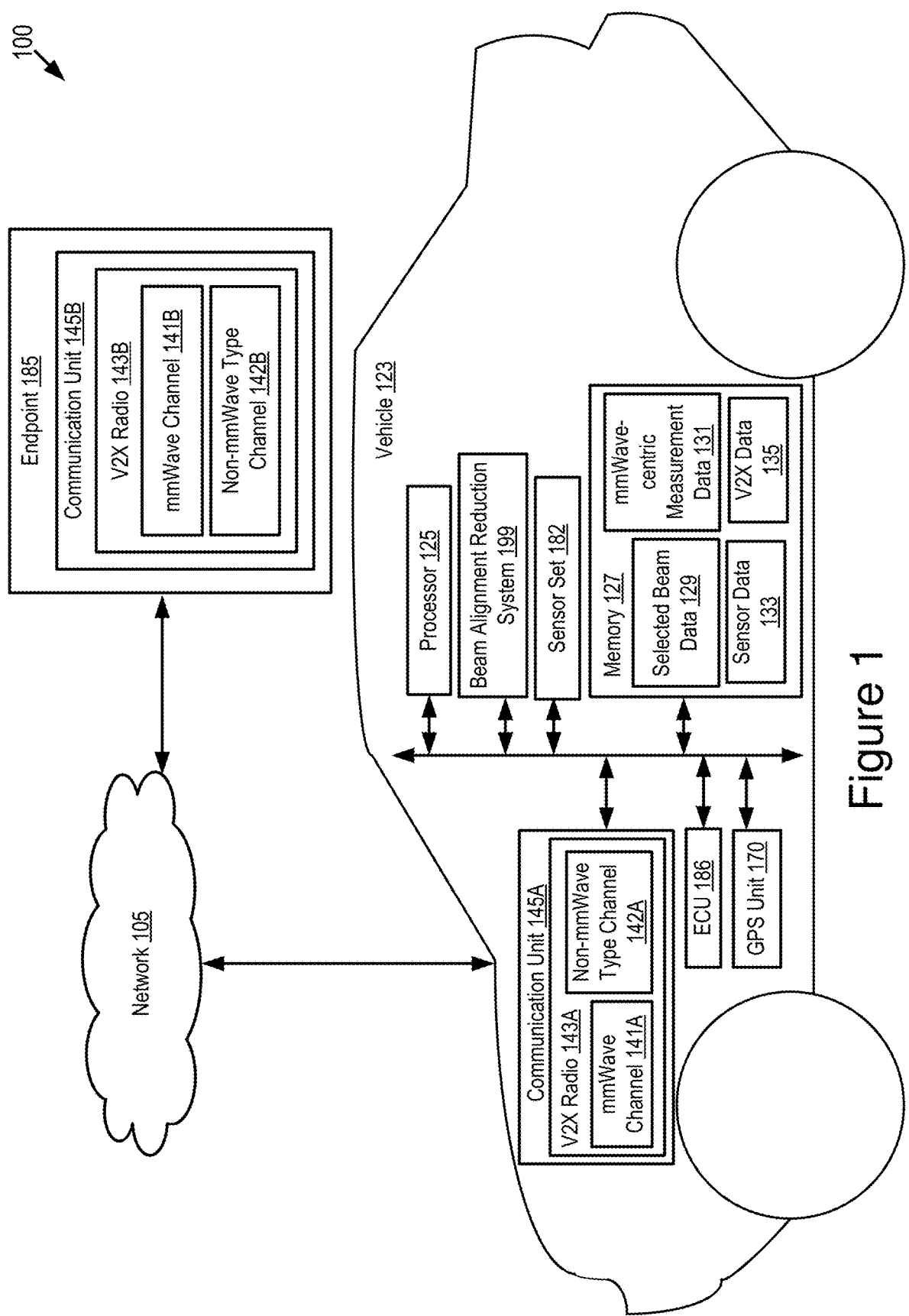
FIG. 1 is a block diagram illustrating an operating environment for a beam alignment reduction system according to some embodiments.

Embodiments of a beam alignment reduction system that are operable to provide efficient beam tracking for mmWave communication beam alignment between a vehicle and an endpoint are now described. The beam alignment reduction system is described with reference to the use of "V2X data."

It should be noted that mmWave communications beneficial since it enables communication devices to send and receive large amounts of data (e.g., 0 to 1000 gigabytes) in an amount of time that is acceptable to users or within some predetermined safety standard. The mmWave communication has a great potential for massive consumer applications (e.g., IEEE802.11ad/WiGig for high-speed and short-range communication; 5G cellular communications; automated driving applications, etc.). The automated driving applications include, but are not limited to: (1) sharing local sensor information recorded by sensors such as a LIDAR, radar, camera, etc., with connected vehicles and infrastructure devices to expand sensor coverage and obtain non-line-of-sight (NLOS) view so as to achieve a safer, efficient and proactive driving; (2) uploading local sensor information to a cloud server via infrastructures high-definition (HD) 3D map generation at the cloud server so that a global HD 3D map can kept updated; and (3) downloading a HD 3D map for automated driving from infrastructures on demand when a vehicle enters a new city so that there is no need to store all 3D map data of an entire country in the vehicle's storage and it is easy to keep the 3D map data updated.

In some embodiments, the beam alignment reduction system uses V2X data, vehicle sensor data or a combination thereof to conduct an initial beam alignment process for the vehicle to exchange a first mmWave communication with a particular endpoint (this endpoint may or may not be another vehicle). A result of this initial beam alignment process is referred to as an "initial mmWave link setup." After the initial mmWave link setup is established, the first mmWave communication occurs between the vehicle and the endpoint via an initial mmWave link provided by the initial mmWave link setup.

As used herein, V2X data includes digital data describing a speed, a location and optionally a path history of an endpoint. The V2X data is transmitted via one or more of the following types of V2X communication that do not include mmWave (i.e., a non-mmWave type of V2X communication): DSRC; LTE-V2X; 5G-V2X; ITS-G5 in Europe; ITS-Connect; and any other type of V2X communication that does not include mmWave. Generally, mmWave communication cannot be used for this wireless communication, for example, because mmWave communication is not possible without a beam alignment procedure achieved by the beam alignment reduction system described herein.

Different non-mmWave types of V2X communication can be used in different countries. For example, if the beam alignment reduction system is implemented in the United States, then DSRC may be ideal for use as the non-mmWave type of V2X communication. If the beam alignment reduction system is implemented in Japan, then ITS-Connect may be ideal for use as the non-mmWave type of V2X communication. If the beam alignment reduction system is implemented in China, then LTE-V2X may be ideal for use as the non-mmWave type of V2X communication.

A first benefit of the beam alignment reduction system described herein includes that the beam alignment reduction system does not perform a complete beam re-alignment process for a second mmWave communication that may occur with the same endpoint as the first mmWave communication. By comparison, existing solutions always perform a complete beam re-alignment process for any second mmWave communications, even when they occur with the same endpoint. This difference between existing solutions and the beam alignment reduction system saves a significant amount of time and makes the beam alignment reduction system more appropriate for vehicular applications when compared to existing solutions.

The beam alignment reduction system may determine whether a second mmWave communication is executed with the same endpoint that is a subject of the first mmWave communication. After a decision is made to execute the second mmWave communication with the same endpoint, the beam alignment reduction system executes a process to determine whether a second mmWave link setup is actually needed based on a set of mmWave-centric measurements that are captured by the vehicle or the endpoint. The beam alignment reduction system analyzes these mmWave-centric measurements and determines, based on this analysis, whether a second mmWave link setup is needed with the endpoint in order to successfully complete the second mmWave communication with the endpoint. This is a second benefit of the beam alignment reduction system because no existing solution considers whether or not a second mmWave link setup is actually needed.

If no second mmWave link setup is needed, then the beam alignment reduction system saves time by not executing any beam re-alignment steps prior to initiating the second mmWave communication with the endpoint.

If a second mmWave link setup is needed, then the beam alignment reduction system executes a limited beam alignment process that is configured to minimize the time needed to establish the second mmWave link setup. This is a third benefit of the beam alignment reduction system. This limited beam alignment process is configured to utilize a result of the initial beam alignment process to reduce the number of beam pairs that are trained, i.e., instead of completing a complete beam re-alignment process anew, the beam alignment reduction system only trains a limited number of beam pairs around the beam pairs that are selected in the initial beam alignment process. By comparison, existing solutions execute a complete beam re-alignment process that considers all available beam pairs and not the limited set of beam pairs that is considered by the beam alignment reduction system described herein.

The beam alignment reduction system provides fast and efficient beam tracking to significantly reduce a beam training overhead (e.g., reducing the number of candidate beam pairs for mmWave beam re-alignment), which is suitable for dynamic vehicular scenarios. The beam alignment reduction system also maintains a high mmWave link quality to enable reliable vehicular mmWave communication. It should be noted that the beam alignment reduction system also has other benefits, which are apparent with further descriptions below with reference to FIGS. 1-8E.

In some embodiments, a vehicle that includes the beam alignment reduction system is a DSRC-equipped vehicle. A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages.

A DSRC-compliant GPS unit is operable to provide positional information for a vehicle (or some other DSRC-equipped device that includes the DSRC-compliant GPS unit) that has lane-level accuracy. In some embodiments, a DSRC-compliant GPS unit is operable to identify, monitor and track its two-dimensional position within 1.5 meters of its actual position 68% of the time under an open sky.

A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway. Some safety or autonomous driving applications provided by the ADAS system of a modern vehicle require positioning information that describes the geographic position of the vehicle with lane-level accuracy. In addition, the current standard for DSRC requires that the geographic position of the vehicle be described with lane-level accuracy.

DSRC has a range of substantially 500 meters and is designed to be compatible for wirelessly sending and receiving messages among mobile nodes such as vehicles and Roadside Units ("RSU" if singular, "RSUs" if plural).

In some embodiments, devices other than vehicles (e.g., an endpoint that is not a vehicle) may be DSRC-equipped. These DSRC-equipped devices may be used to relay wireless vehicle data to the vehicle via a DSRC message. For example, an RSU or any other communication device may be DSRC-equipped if it includes one or more of the following elements: a DSRC transceiver and any software or hardware necessary to encode and transmit a DSRC message; and a DSRC receiver and any software or hardware necessary to receive and decode a DSRC message.

The embodiments described herein may use V2X communication to transmit and receive V2X data among a vehicle and an endpoint. V2X data may include any data that is: (1) associated with a vehicle or an endpoint; and (2) transmitted via a wireless message such as a DSRC message or a BSM message by either a DSRC-equipped vehicle or a DSRC-equipped endpoint.

For simplicity and convenience of description, a wireless message described herein may be referred to as a V2X wireless message. An example V2X wireless message is a DSRC message that includes wireless vehicle data. There are many types of DSRC messages. One type of DSRC messages is known as a Basic Safety Message ("BSM" or a "BSM message"). DSRC-equipped vehicles broadcast a BSM at a regular interval. The interval may be user adjustable. In some embodiments, the interval may be once every 0.10 seconds.

A BSM includes BSM data. The BSM data describes attributes of the vehicle that originally transmitted the BSM. The BSM data describes, among other things, one or more of the following: (1) the path history of the vehicle that transmits the BSM; (2) the speed of the vehicle that transmits the BSM; and (3) the GPS data describing a location of the vehicle that transmits the BSM.

In some embodiments, DSRC-equipped vehicles may probe other DSRC-equipped vehicles/devices along the roadway for information describing their current and future conditions, including their path history, future path, and sensor data they may have received or generated. This information is described as "DSRC probe data." DSRC probe data may include any data received via a DSRC probe or responsive to a DSRC probe.

A DSRC message may include DSRC-based data. The DSRC-based data may include BSM data or DSRC probe data. In some embodiments, the DSRC-based data included in a DSRC message may include BSM data or DSRC probe data received from a plurality of DSRC-equipped vehicles (or other DSRC-equipped devices or endpoints). This BSM data or DSRC probe data may include an identifier of its source and the location of the source or any traffic events described by the BSM data or DSRC probe data.

The BSM data or DSRC probe data may specify which lane a vehicle is traveling in as well as its speed of travel and path history. The BSM data or DSRC probe data may further specify one or more of the following: a velocity of the vehicle at one or more different times or one or more different locations; a heading of the vehicle at one or more different times or one or more different locations; and an acceleration of the vehicle at one or more different times or one or more different locations.

Example Overview

Referring to FIG. 1, depicted is an operating environment 100 for a beam alignment reduction system 199. The operating environment 100 may include one or more of the following elements: a vehicle 123; and an endpoint 185. These elements of the operating environment 100 may be communicatively coupled to a network 105. Although not depicted in FIG. 1, the operation environment 100 may include one or more RSUs that are DSRC-enabled. The one or more DSRC-enabled RSUs may relay wireless messages among the vehicle 123 and the endpoint 185 via the network 105. For example, the range of DSRC transmissions is generally about 500 meters, and so, if the endpoint 185 is 700 meters away from the vehicle 123, then one or more intervening DSRC-enabled RSUs may relay a DSRC message from the endpoint 185 to the vehicle 123 or from the vehicle 123 to the endpoint 185.

Although one vehicle 123, one endpoint 185 and one network 105 are depicted in FIG. 1, in practice the operating environment 100 may include one or more vehicles 123, one or more endpoints 185 and one or more networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2V, LTE-V2X, LTE-D2D, VoLTE, LTE-5G or any other mobile data network or combination of mobile data networks. Further, the network 105 may include one or more IEEE 802.11 wireless networks.

In some embodiments, the network 105 is a V2X network, which is a wireless network for sending and receiving V2X wireless messages among various endpoints (e.g., vehicles, roadside equipment, etc.) that each include a V2X radio.

Each of the channels of the V2X radio may transmit and receive different types of V2X messages. For example, V2X channel #1 may transmit and receive mmWave messages, whereas V2X channel #2 may transmit and receive non-mmWave type V2X messages, such as one of the following: DSRC; LTE-V2X; 5G-V2X; ITS-G5 in Europe; ITS-Connect; or some other type of V2X communication that does not include mmWave. The non-mmWave type V2X channel is an optional feature and not required for all embodiments (see, e.g., FIGS. 7A-7B described above).

In some embodiments, one or more of the vehicle 123 and the endpoint 185 may be DSRC-equipped devices. The network 105 may include one or more communication channels shared among the vehicle 123, the endpoint 185 and one or more RSUs. The one or more communication channels may include DSRC, LTE-V2X, full-duplex wireless communication or any other wireless communication protocol. For example, the network 105 may be used to transmit a DSRC message, DSRC probe or BSM including any of the data described herein.

The vehicle 123 may be any type of vehicle. For example, the vehicle 123 may include one of the following types of vehicles: a car; a truck; a sports utility vehicle; a bus; a semi-truck; a drone or any other roadway-based conveyance.

In some embodiments, the vehicle 123 may include an autonomous vehicle or a semi-autonomous vehicle. For example, the vehicle 123 may include an Advanced Driver-Assistance System (ADAS). The ADAS system may provide some or all of the functionality that provides autonomous functionality.

The vehicle 123 may include one or more of the following elements: a processor 125; a memory 127; a communication unit 145A; a GPS unit 170; a sensor set 182; an ECU 186; and the beam alignment reduction system 199. These elements of the vehicle 123 may be communicatively coupled to one another via a bus.

In some embodiments, the processor 125 and the memory 127 may be elements of an onboard vehicle computer system (such as computer system 200 described below with reference to FIG. 2). The onboard vehicle computer system may be operable to cause or control the operation of the beam alignment reduction system 199. The onboard vehicle computer system may be operable to access and execute the data stored on the memory 127 to provide the functionality described herein for the beam alignment reduction system 199 or its elements (see, e.g., FIG. 2).

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The vehicle 123 may include one or more processors 125. Other processors, operating systems, sensors, displays, and physical configurations may be possible.

The memory 127 stores instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The vehicle 123 may include one or more memories 127.

The memory 127 of the vehicle 123 may store one or more of the following elements: selected beam data 129; mmWave-centric measurement data 131; sensor data 133; and V2X data 135.

In some embodiments, the selected beam data 129 describes one or more selected beam pairs that are used between the vehicle 123 and the endpoint 185 to complete an mmWave communication. For example, the selected beam data 129 describes one or more selected beam pairs included in a setup result of an initial mmWave link setup, and the one or more selected beam pairs are used to complete a first mmWave communication process between the vehicle 123 and the endpoint 185.

In some embodiments, the mmWave-centric measurement data 131 describes one or more mmWave-centric measurements. The one or more mmWave-centric measurements include, but are not limited to, one or more of the following: an mmWave signal strength associated with the initial mmWave link setup; a distance that the endpoint 185 has traveled since a previous mmWave communication process is performed (e.g., a distance that the endpoint 185 has traveled since the first mmWave communication process is performed); a speed of the endpoint 185; and a change on a relative position between the vehicle 123 and the endpoint 185. Examples of a relative position are shown in FIGS. 8D-8E.

In some embodiments, the sensor data 133 describes one or more sensor measurements recorded by the sensor set 182. For example, the sensor data 133 includes data generated by radar, an LIDAR, a camera, or any other types of sensors in the sensor set 182 of the vehicle 123 and is used to determine a location and a speed of the endpoint 185.

In some embodiments, the V2X data 135 includes data provided in a V2X wireless message. For example, the endpoint 185 generates a non-mmWave type V2X message including the V2X data 135 and transmits the non-mmWave type V2X message to the vehicle 123, where the V2X data 135 includes data describing a location and a speed of the endpoint 185.

The communication unit 145A transmits and receives data to and from a network 105 or to another communication channel. In some embodiments, the communication unit 145A may include a DSRC transceiver, a DSRC receiver and other hardware or software necessary to make the vehicle 123 a DSRC-enabled device. For example, the communication unit 145A includes a DSRC antenna configured to broadcast DSRC messages via the network. The DSRC antenna may also transmit BSM messages at a fixed interval (e.g., every 0.1 seconds, at a time interval corresponding to a frequency range from 1.6 Hz to 10 Hz, etc.) that is user configurable.

In some embodiments, the communication unit 145A includes a port for direct physical connection to the network 105 or to another communication channel. For example, the communication unit 145A includes a USB, SD, CAT-5, or similar port for wired communication with the network 105. In some embodiments, the communication unit 145A includes a wireless transceiver for exchanging data with the network 105 or other communication channels using one or more wireless communication methods, including: IEEE 802.11; IEEE 802.16, BLUETOOTH®; EN ISO 14906:

2004 Electronic Fee Collection—Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145A includes a full-duplex coordination system as described in U.S. patent application Ser. No. 14/471,387 filed on Aug. 28, 2014 and entitled "Full-Duplex Coordination System."

In some embodiments, the communication unit 145A includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145A includes a wired port and a wireless transceiver. The communication unit 145A also provides other conventional connections to the network 105 for distribution of files or media objects using standard network protocols including TCP/IP, HTTP, HTTPS, and SMTP, millimeter wave, DSRC, etc.

The communication unit 145A includes a V2X radio 143A. The V2X radio 143A is an electronic device that includes a V2X transmitter and a V2X receiver and is operable to send and receive wireless messages via any V2X protocol. For example, the V2X radio 143A is operable to send and receive wireless messages via DSRC. The V2X transmitter is operable to transmit and broadcast DSRC messages over the 5.9 GHz band. The V2X receiver is operable to receive DSRC messages over the 5.9 GHz band. The V2X radio 143A includes multiple channels including an mmWave channel 141A and a non-mmWave type channel 142A. The mmWave channel 141A is used for performing mmWave communications. The non-mmWave type channel 142A is used for performing non-mmWave type communications (e.g., DSRC communications or any other type of V2X communications that does not include mmWave).

In some embodiments, the GPS unit 170 is a conventional GPS unit of the vehicle 123. For example, the GPS unit 170 may include hardware that wirelessly communicates with a GPS satellite to retrieve data that describes a geographic location of the vehicle 123. For example, the GPS unit 170 retrieves GPS data describing the geographic location of the vehicle 123 from one or more GPS satellites. In some embodiments, the GPS unit 170 is a DSRC-compliant GPS unit of the vehicle 123 that is operable to provide GPS data describing the geographic location of the vehicle 123 with lane-level accuracy.

As used herein, the words "geographic location," "location," "geographic position" and "position" refer to a latitude and longitude of an object such as the vehicle 123 or the endpoint 185. The example embodiments described herein provide positioning information that describes a geographic position of a vehicle with an accuracy of at least plus or minus 1.5 meters in relation to the actual geographic position of the vehicle. Accordingly, the example embodiments described herein are able to describe the geographic position of the vehicle with lane-level accuracy or better.

The sensor set 182 includes one or more sensors that are operable to measure a roadway environment outside of the vehicle 123. For example, the sensor set 182 may include one or more sensors that record one or more physical characteristics of the roadway environment that is proximate to the vehicle 123. The memory 127 may store sensor data that describes the one or more physical characteristics recorded by the sensor set 182. The roadway environment outside of the vehicle 123 may include the endpoint 185, and so, one or more of the sensors of the sensor set 182 may record sensor data that describes information about the endpoint 185.

In some embodiments, the sensor set 182 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The ECU 186 is an embedded system in automotive electronics that controls one or more of electrical systems or subsystems in the vehicle 123. Types of the ECU 186 include, but are not limited to, the following: Engine Control Module (ECM); Powertrain Control Module (PCM); Transmission Control Module (TCM); Brake Control Module (BCM or EBCM); Central Control Module (CCM); Central Timing Module (CTM); General Electronic Module (GEM); Body Control Module (BCM); and Suspension Control Module (SCM), etc.

In some embodiments, the vehicle 123 may include multiple ECUs. In some embodiments, the beam alignment reduction system 199 may be an element of the ECU 186.

In some embodiments, the beam alignment reduction system 199 includes software that is operable, when executed by the processor 125, to cause the processor 125 to execute one or more steps of methods 300, 400 and 500 and example process 600 and 700 described below with reference to FIGS. 3-7B.

In some embodiments, the beam alignment reduction system 199 uses V2X data, sensor data or a combination thereof to conduct an initial beam alignment process for the vehicle 123 to exchange a first mmWave communication with the endpoint 185. The beam alignment reduction system 199 does not perform a complete beam re-alignment process for a second mmWave communication that may occur with the same endpoint 185 as the first mmWave communication. Instead, after a decision is made to execute a second mmWave communication with this same endpoint 185, the beam alignment reduction system 199 first executes a process to determine whether a second mmWave link setup is actually needed. If no second mmWave link setup is needed, then the beam alignment reduction system 199 saves time by not executing any beam re-alignment steps prior to initiating the second mmWave communication with the endpoint 185. If a second mmWave link setup is needed, then the beam alignment reduction system 199 executes a limited beam alignment process that is configured to minimize the time needed to establish the second mmWave link setup.

In some embodiments, the beam alignment reduction system 199 may be implemented using hardware including a field-programmable gate array ("FPGA") or an application-specific integrated circuit ("ASIC"). In some other embodiments, the beam alignment reduction system 199 may be implemented using a combination of hardware and software. The beam alignment reduction system 199 may be stored in a combination of the devices (e.g., servers or other devices), or in one of the devices.

The endpoint 185 can be any communication device in a roadway environment. In some embodiments, the endpoint 185 is a vehicle. For example, the endpoint 185 can be a vehicle similar to the vehicle 123. In another example, the endpoint 185 can be a vehicle different from the vehicle 123. In some embodiments, the endpoint 185 is a non-vehicle type endpoint. For example, the endpoint 185 can be an infrastructure device (e.g., a RSU, an edge/fog server, a cloud server, a cellular base station, etc.).

The endpoint 185 includes a communication unit 145B. The communication unit 145B includes a V2X radio 143B, which includes an mmWave channel 141B and a non-mmWave type channel 142B.

The communication unit 145A of the vehicle 123 and the communication unit 145B of the endpoint 185 may be referred to herein collectively or individually as the "communication unit 145" since, for example, the communication unit 145A of the vehicle 123 provides similar functionality to the components of the vehicle 123 as does the communication unit 145B of the endpoint 185. For similar reasons, the description provided herein uses the following terms when referring to elements that are common to the vehicle 123 and the endpoint 185 and provide similar functionality to the vehicle 123 or the endpoint 185: the "V2X radio 143" when referring to the V2X radio 143A and the V2X radio 143B, collectively or individually; the "mmWave channel 141" when referring to the mmWave channel 141A and the mmWave channel 141B, collectively or individually; and the "non-mmWave type channel 142" when referring to the non-mmWave type channel 142A and the non-mmWave type channel 142B, collectively or individually.

Example Computer System

Figure 2:
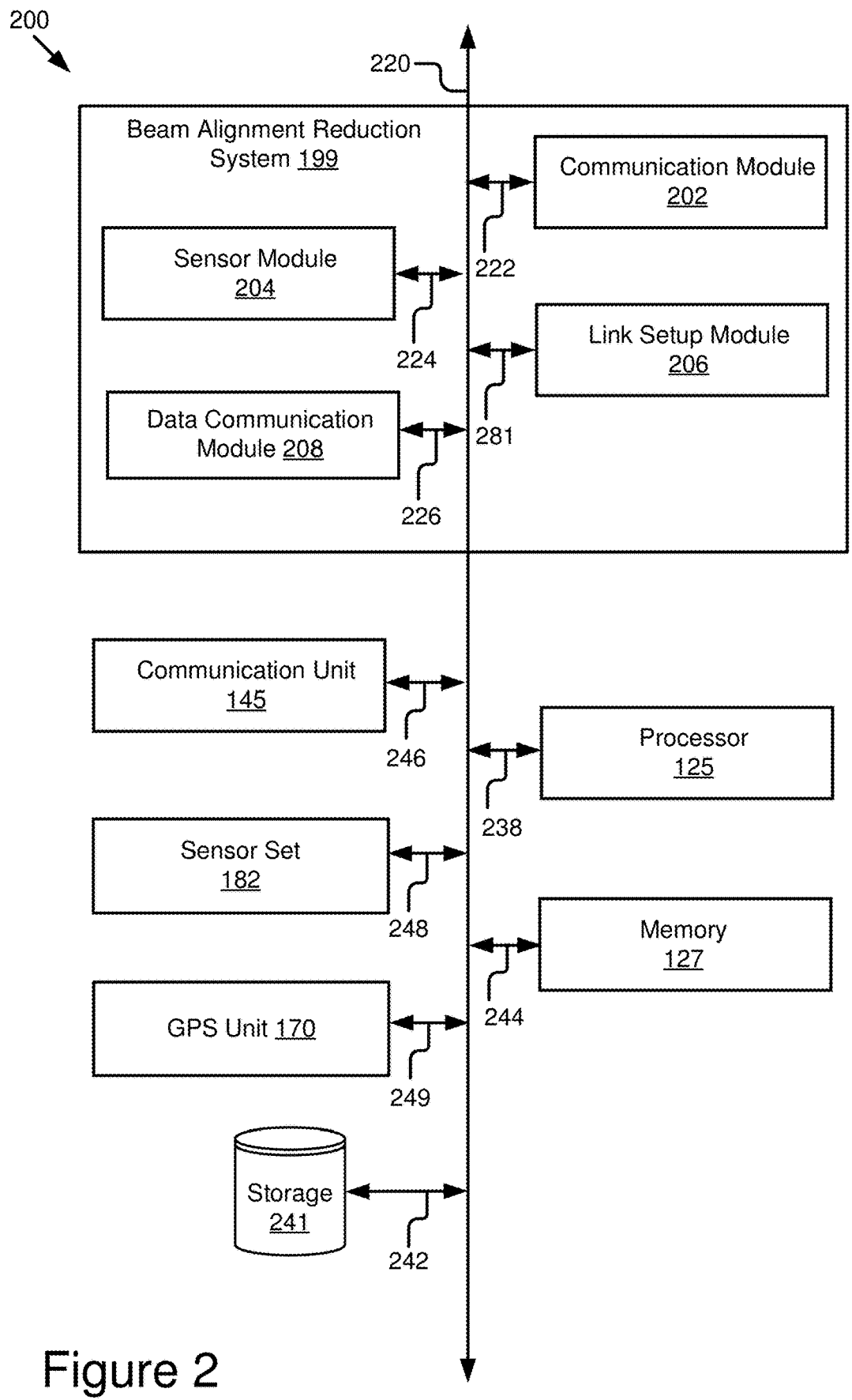
FIG. 2 is a block diagram illustrating an example computer system including a beam alignment reduction system according to some embodiments.

Referring now to FIG. 2, depicted is a block diagram illustrating an example computer system 200 including the beam alignment reduction system 199 according to some embodiments. In some embodiments, the computer system 200 may include a special-purpose computer system that is programmed to perform one or more steps of methods 300, 400 and 500 described below with reference to FIGS. 3-5B, processes 600 and 700 described below with reference to FIGS. 6A-7B.

In some embodiments, the computer system 200 may be an element of the vehicle 123. In some embodiments, the computer system 200 may be an onboard vehicle computer of the vehicle 123. In some embodiments, the computer system 200 may include an engine control unit, head unit or some other processor-based computing device of the vehicle 123.

The computer system 200 may include one or more of the following elements according to some examples: the beam alignment reduction system 199; the processor 125; the communication unit 145; the sensor set 182; the GPS unit 170; the memory 127; and a storage 241. The components of the computer system 200 are communicatively coupled by a bus 220.

In the illustrated embodiment, the processor 125 is communicatively coupled to the bus 220 via a signal line 238. The communication unit 145 is communicatively coupled to the bus 220 via a signal line 246. The sensor set 182 is communicatively coupled to the bus 220 via a signal line 248. The GPS unit 170 is communicatively coupled to the bus 220 via a signal line 249. The storage 241 is communicatively coupled to the bus 220 via a signal line 242. The memory 127 is communicatively coupled to the bus 220 via a signal line 244.

The following elements of the computer system 200 are described above with reference to FIG. 1, and so, those descriptions will not be repeated here: the processor 125; the communication unit 145; the sensor set 182; the GPS unit 170; and the memory 127.

The storage 241 can be a non-transitory storage medium that stores data for providing the functionality described herein. The storage 241 may be a dynamic random-access memory (DRAM) device, a static random-access memory (SRAM) device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment shown in FIG. 2, the beam alignment reduction system 199 includes: a communication module 202; a sensor module 204; a link setup module 206; and a data communication module 208. These components of the beam alignment reduction system 199 are communicatively coupled to each other via the bus 220. In some embodiments, components of the beam alignment reduction system 199 can be stored in a single server or device. In some other embodiments, components of the beam alignment reduction system 199 can be distributed and stored across multiple servers or devices. For example, some of the components of the beam alignment reduction system 199 may be distributed across the endpoint 185 and the vehicle 123.

The communication module 202 can be software including routines for handling communications between the beam alignment reduction system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via a signal line 222.

The communication module 202 sends and receives data, via the communication unit 145, to and from one or more elements of the operating environment 100. For example, the communication module 202 receives or transmits, via the communication unit 145, a V2X wireless message. The communication module 202 may send or receive any of the data or messages described above with reference to FIG. 1 via the communication unit 145.

In some embodiments, the communication module 202 receives data from components of the beam alignment reduction system 199 and stores the data in one or more of the storage 241 and the memory 127. For example, the communication module 202 receives any of the data described above with reference to the memory 127 from the communication unit 145 (via the network 105, a DSRC message, a BSM, a DSRC probe, a full-duplex wireless message, etc.) and stores this data in the memory 127 (or temporarily in the storage 241 which may act as a buffer for the computer system 200).

In some embodiments, the communication module 202 may handle communications between components of the beam alignment reduction system 199. For example, the communication module 202 may handle communications among the sensor module 204, the link setup module 206 and the data communication module 208. Any of these modules may cause the communication module 202 to communicate with the other elements of the computer system 200 or the operating environment 100 (via the communication unit 145). For example, the sensor module 204 may use the communication module 202 to communicate with the sensor set 182 and cause the sensor set 182 to record sensor data.

In some embodiments, the communication module 202 receives a V2X wireless message from the network 105, and the V2X wireless message includes V2X data generated by the endpoint 185. For example, the V2X wireless message is selected from a group that consists of: a DSRC message; a BSM; a LTE message; a LTE-V2X wireless message; a 5G-LTE message; and any other non-mmWave type message, etc. The communication module 202 retrieves the V2X data from the V2X wireless message and sends the V2X data to the link setup module 206.

The sensor module 204 can be software including routines for using one or more sensors included in the sensor set 182 to generate sensor data. In some embodiments, the sensor module 204 can be stored in the memory 127 of the computer system 200 and can be accessible and executable by the processor 125. The sensor module 204 may be adapted for cooperation and communication with the processor 125 and other components of the computer system 200 via a signal line 224.

In some embodiments, the sensor module 204 may operate one or more sensors of the sensor set 182 to generate sensor data describing the measurements of the sensor set 182. The sensor module 204 may cause the sensor data to be stored in the memory 127. Specifically, the sensor module 204 may operate one or more sensors included in the sensor set 182 to record sensor data describing measurements of a physical environment proximate to the computer system 200. The endpoint 185 may be located in the physical environment proximate to the vehicle 123 that includes the computer system 200.

In some embodiments, the sensor data may be used to detect presence of the endpoint 185. For example, the sensor module 204 operates a camera sensor included in the sensor set 182 to capture an image of a physical environment proximate to the vehicle 123, where the image captures the endpoint 185 near the vehicle 123. The link setup module 206 described below may detect presence of the endpoint 185 by performing an image processing technique on the image to identify the endpoint 185 in the image.

In some embodiments, the sensor data may be used to determine a set of mmWave-centric measurements related to the endpoint 185. For example, the link setup module 206 described below may analyze the sensor data to determine one or more of the following: an mmWave signal strength associated with a previous mmWave link setup (e.g., an mmWave signal strength associated with the initial mmWave link setup); a distance that the endpoint 185 has traveled since a previous mmWave communication process is performed (e.g., a distance that the endpoint 185 has traveled since the first mmWave communication process is performed); a speed of the endpoint 185; and a relative position or a change on the relative position between the vehicle 123 and the endpoint 185.

In some embodiments, the sensor module 204 may cause the GPS unit 170 to retrieve positional information for the computer system 200. For example, the computer system 200 is an element of the vehicle 123 and the sensor module 204 may cause the GPS unit 170 to retrieve GPS data describing the geographic location of the vehicle 123.

The link setup module 206 can be software including routines that, when executed by the processor 125, cause the processor 125 to establish an mmWave link setup for performing an mmWave communication process with the endpoint 185. In some embodiments, the link setup module 206 can be a set of instructions stored in the memory 127 of the computer system 200 and can be accessible and executable by the processor 125. The link setup module 206 may be adapted for cooperation and communication with the processor 125 and other components of the computer system 200 via a signal line 281.

In some embodiments, the link setup module 206 is operable to execute an initial beam alignment process to establish an initial mmWave link setup with the endpoint 185 so that a first mmWave communication process is performed with the endpoint 185. Specifically, the link setup module 206 retrieves V2X data from a non-mmWave type V2X wireless message received from the endpoint 185 and executes the initial beam alignment process based on the V2X data. Alternatively, or additionally, the link setup module 206 retrieves sensor data from one or more sensors of the vehicle 123 and executes the initial beam alignment process based on the sensor data.

For example, the link setup module 206 determines a location and a speed of the endpoint 185 based on the V2X data and estimates a future location of the endpoint 185 based on the location and the speed of the endpoint 185. The link setup module 206 sweeps a beam of an mmWave communication unit of the vehicle 123 (e.g., the communication unit 145 of the vehicle 123 with the mmWave communication capability) based on the future location of the endpoint 185 to align the beam of the mmWave communication unit of the vehicle 123 with the endpoint 185 so that the initial mmWave link setup is established. A setup result of the initial mmWave link setup includes selected beam data describing one or more selected beam pairs that are used to perform the first mmWave communication process between the vehicle 123 and the endpoint 185.

In another example, the link setup module 206 determines a location and a speed of the endpoint 185 based on the sensor data recorded by onboard sensors of the vehicle 123 and estimates a future location of the endpoint 185 based on the location and the speed of the endpoint 185. The link setup module 206 sweeps a beam of an mmWave communication unit of the vehicle 123 (e.g., the communication unit 145 of the vehicle 123 with the mmWave communication capability) based on the future location of the endpoint 185 to align the beam of the mmWave communication unit of the vehicle 123 with the endpoint 185 so that the initial mmWave link setup is established.

Examples of the initial mmWave link setup are illustrated with reference to FIGS. 6A, 7A and 8A-8B described below.

After the initial mmWave link setup is completed, the link setup module 206 causes the data communication module 208 described below to perform the first mmWave communication process with the endpoint 185. For example, the vehicle 123 and the endpoint 185 can exchange data with each other via an initial mmWave link established by the initial mmWave link setup.

In some embodiments, the link setup module 206 determines a second mmWave communication process is to occur between the vehicle 123 and the endpoint 185. For example, after the first mmWave communication process is performed, there is still data needed to be exchanged between the vehicle 123 and the endpoint 185. The link setup module 206 is operable to determine whether a second mmWave link setup is needed in order to perform the second mmWave communication process with the endpoint 185. Specifically, the link setup module 206 determines whether the second mmWave link setup is needed based on a set of mmWave-centric measurements. For example, the link setup module 206 determines the set of mmWave-centric measurements since the first mmWave communication process is performed, analyzes the set of mmWave-centric measurements to generate an analysis result, and determines whether the second mmWave link setup is needed based on the analysis result.

In some examples, the link setup module 206 determines the set of mmWave-centric measurements based on sensor data recorded by onboard sensors of the vehicle 123, V2X data generated by the endpoint 185 or a combination thereof.

Responsive to determining that the second mmWave link setup is not needed, the link setup module 206 causes the data communication module 208 to perform the second mmWave communication process with the endpoint 185 without establishing the second mmWave link setup so that the amount of time needed to establish the second mmWave link setup is saved. On the other hand, responsive to determining that the second mmWave link setup is needed, the link setup module 206 executes a limited beam alignment process to establish the second mmWave link setup so that an amount of time needed to establish the second mmWave link setup is minimized.

For example, assume that the vehicle 123 and the endpoint 185 (which is also a vehicle) are near to one another and travel on two adjacent lanes respectively in a same direction during the initial mmWave link setup and the first mmWave communication process. An analysis result of the mmWave-centric measurements includes data describing that: after the first mmWave communication process is performed, a change on a relative position between the vehicle 123 and the endpoint 185 is within a first position threshold so that there is no need to establish the second mmWave link setup (e.g., this is because the initial mmWave link established by the initial mmWave link setup can still be used to perform the second mmWave communication process). The first position threshold can be user-configurable or can be determined based on actual measurements conducted in simulated or real-world roadway environments.

In another example, assume that the analysis result of the mmWave-centric measurements indicates that the change on the relative position between the vehicle 123 and the endpoint 185 exceeds the first position threshold but is within a second position threshold (which means the initial mmWave link established by the initial mmWave link setup needs to be adjusted in order to perform the second mmWave communication process). In this case, the link setup module 206 performs a limited beam alignment process based on a setup result of the initial mmWave link setup as described below in more detail. The second position threshold can be user-configurable or can be determined based on actual measurements conducted in simulated or real-world roadway environments.

In yet another example, assume that the analysis result of the mmWave-centric measurements indicates that the change on the relative position between the vehicle 123 and the endpoint 185 exceeds the second position threshold (which means a complete new mmWave link is needed to be established in order to perform the second mmWave communication process because the relative position between the vehicle 123 and the endpoint 185 has changed significantly and the setup result of the initial mmWave link setup is completely outdated). An example scenario where the setup result of the initial mmWave link setup is completely outdated includes that: previously the endpoint 185 travels ahead of the vehicle 123 in a same lane, and now the endpoint 185 travels behind the vehicle 123 in the same lane. In this case, the link setup module 206 performs a complete new beam alignment process for the second mmWave communication process. The third position threshold can be user-configurable or can be determined based on actual measurements conducted in simulated or real-world roadway environments.

In some embodiments, the link setup module 206 executes the limited beam alignment process by: completing the limited beam alignment process based on a setup result of the initial mmWave link setup so that the amount of time needed to establish the second mmWave link setup is substantially reduced compared to an amount of time needed to establish the initial mmWave link setup. For example, the link setup module 206 retrieves selected beam data describing one or more selected beam pairs in the setup result of the initial mmWave link setup, where the one or more selected beam pairs are used between the vehicle 123 and the endpoint 185 to complete the first mmWave communication process. Then, the link setup module 206 trains a limited number of beam pairs around the one or more selected beam pairs to establish the second mmWave link setup.

In some embodiments, each of the one or more selected beam pairs in the setup result of the initial mmWave link setup includes a selected vehicle-side beam lobe and a selected endpoint-side beam lobe. The link setup module 206 determines the limited number of beam pairs trained in the limited beam alignment process to include beam pairs formed by a list of vehicle-side beam lobes and a list of endpoint-side beam lobes. The list of vehicle-side beam lobes includes: (1) the selected vehicle-side beam lobe; and (2) one or more vehicle-side beam lobes that are next to the selected vehicle-side beam lobe. The list of the endpoint-side beam lobes includes; (1) the selected endpoint-side beam lobe; and (2) one or more endpoint-side beam lobes that are next to the selected endpoint-side beam lobe. However, a total number of beam pairs in the limited number of beam pairs is much less than a total number of beam pairs trained during the initial mmWave link setup.

Examples of the limited beam alignment process as well as the limited number of beam pairs are provided below with reference to FIGS. 8C-8E.

After the second mmWave link setup is established, the link setup module 206 causes the data communication module 208 to perform the second mmWave communication process with the endpoint 185 via a second mmWave link provided by the second mmWave link setup. The link setup module 206 is described further below with reference to FIGS. 3-8E.

The data communication module 208 can be software including routines that, when executed by the processor 125, cause the processor 125 to perform mmWave communication processes with the endpoint 185. In some embodiments, the data communication module 208 can be stored in the memory 127 of the computer system 200 and can be accessible and executable by the processor 125. The data communication module 208 may be adapted for cooperation and communication with the processor 125 and other components of the computer system 200 via a signal line 226.

In some embodiments, responsive to the initial mmWave link setup being established by the initial beam alignment process, the data communication module 208 performs a first mmWave communication process with the endpoint 185. For example, the data communication module 208 causes the communication unit 145 to exchange data with the endpoint 185 via an initial mmWave link established by the initial mmWave link setup.

In some embodiments, responsive to a determination that a second mmWave link setup is not needed for performing a second mmWave communication process with the endpoint 185, the data communication module 208 performs the second mmWave communication process with the endpoint 185 via the initial mmWave link established by the initial mmWave link setup.

In some embodiments, responsive to a second mmWave link setup being established by the limited beam alignment process, the data communication module 208 performs the second mmWave communication process with the endpoint 185 via a second mmWave link established by the second mmWave link setup.

Example Processes

Figure 3:
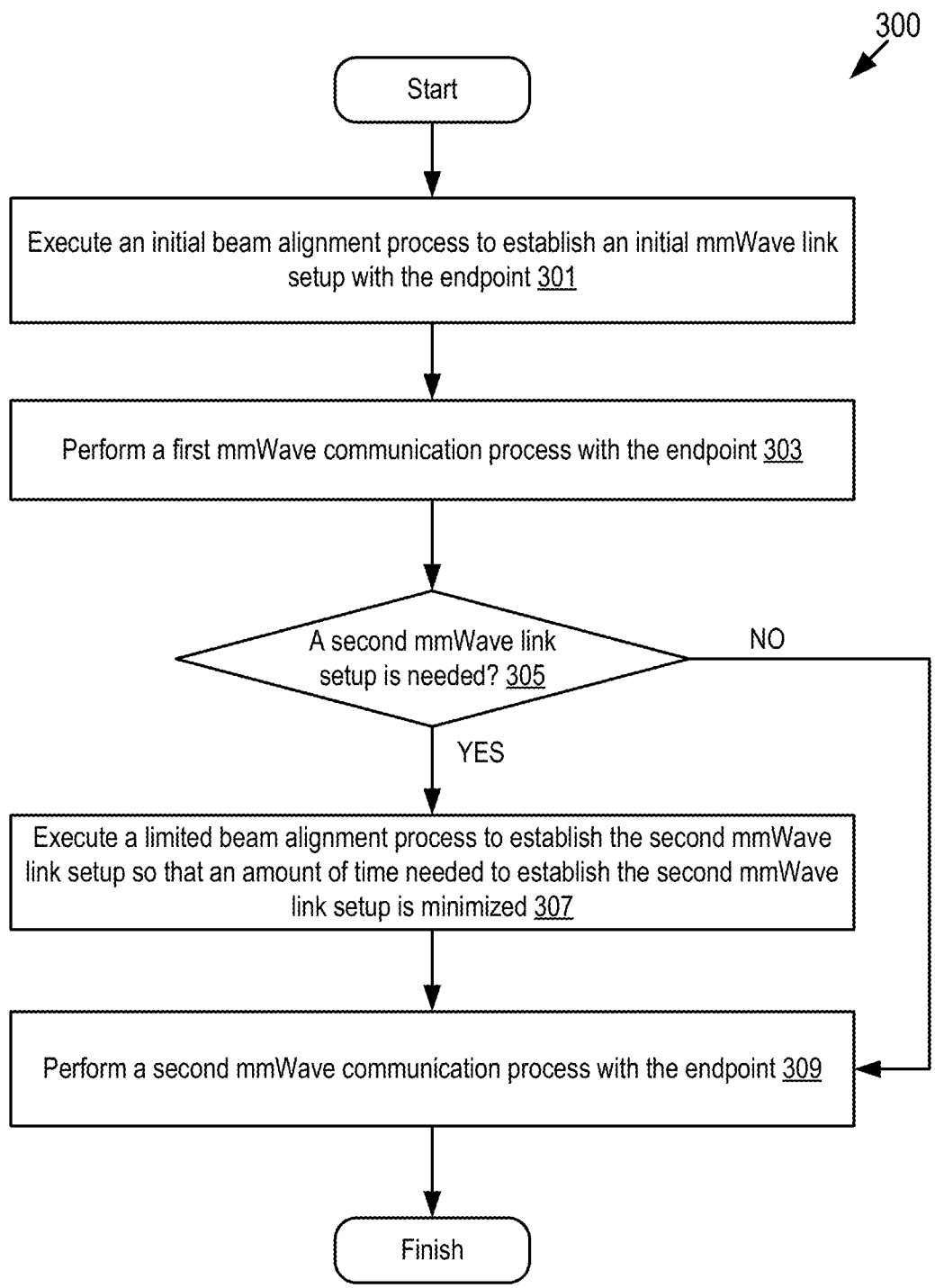
FIG. 3 depicts a method for providing efficient beam tracking for mmWave communication beam alignment according to some embodiments.

Referring now to FIG. 3, depicted is a flowchart of an example method 300 for providing efficient beam tracking for mmWave communication beam alignment according to some embodiments. The steps of the method 300 are executable in any order, and not necessarily the order depicted in FIG. 3.

At step 301, the link setup module 206 executes an initial beam alignment process to establish an initial mmWave link setup with the endpoint 185.

At step 303, the data communication module 208 performs a first mmWave communication process with the endpoint 185 via an initial mmWave link established by the initial mmWave link setup.

The link setup module 206 determines that a second mmWave communication process is to occur between the vehicle 123 and the endpoint 185. At step 305, the link setup module 206 determines whether a second mmWave link setup is needed. If the second mmWave link setup is needed, the method 300 proceeds to step 307. Otherwise, the method 300 proceeds to step 309.

At step 307, the link setup module 206 executes a limited beam alignment process to establish the second mmWave link setup so that an amount of time needed to establish the second mmWave link setup is minimized.

At step 309, the data communication module 208 performs the second mmWave communication process with the endpoint 185. For example, responsive to determining that the second mmWave link setup is not needed, the data communication module 208 performs the second mmWave communication process with the endpoint 185 via the initial mmWave link established by the initial mmWave link setup. In another example, responsive to the second mmWave link setup being established, the data communication module 208 performs the second mmWave communication process with the endpoint 185 via a second mmWave link established by the second mmWave link setup.

Figure 4:
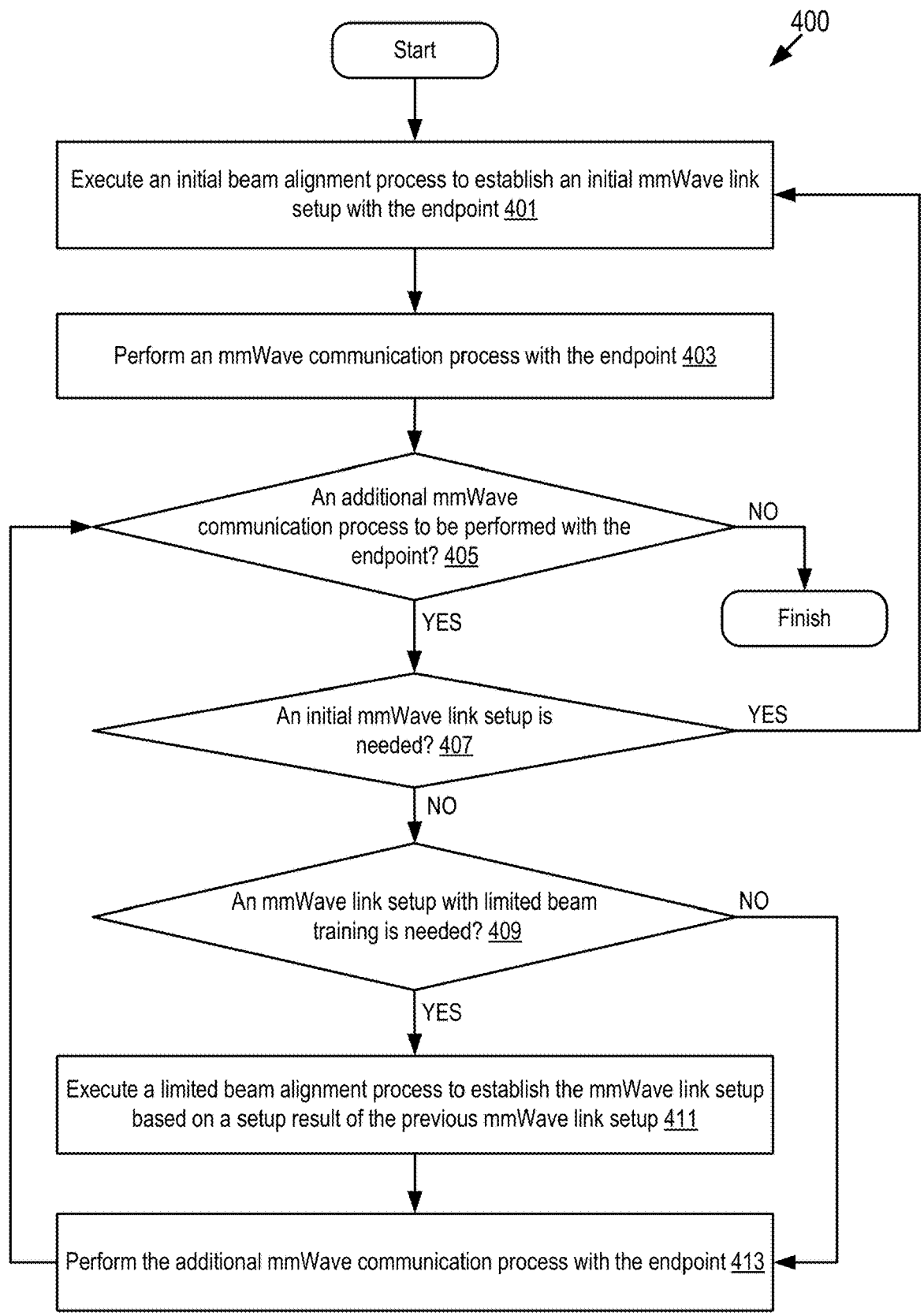
FIG. 4 depicts another method for providing efficient beam tracking for mmWave communication beam alignment according to some embodiments.

FIG. 4 depicts a method 400 for providing efficient beam tracking for mmWave communication beam alignment according to some embodiments. The steps of the method 400 are executable in any order, and not necessarily the order depicted in FIG. 4.

At step 401, the link setup module 206 executes an initial beam alignment process to establish an initial mmWave link setup with the endpoint 185.

At step 403, the data communication module 208 performs an mmWave communication process with the endpoint 185 via the initial mmWave link established by the initial mmWave link setup.

At step 405, the link setup module 206 determines whether an additional mmWave communication process is to be performed with the endpoint 185. For example, the link setup module 206 determines whether there is any additional data to be exchanged between the vehicle 123 and the endpoint 185 since the previous mmWave communication process is performed. If there is at least an additional mmWave communication process to occur, the method 400 proceeds to step 407. Otherwise, the method 400 ends.

At step 407, the link setup module 206 determines whether a complete new mmWave link setup (e.g., a complete new mmWave link setup like the initial mmWave link setup) is needed. In some embodiments, the link setup module 206 determines a set of mmWave-centric measurements based on V2X data (e.g., BSM data) received from the endpoint 185, sensor data recorded by sensors of the vehicle 123 or a combination thereof and determines whether a complete new mmWave link setup is needed based on the set of mmWave-centric measurements. If a complete new mmWave link setup is needed, the method 400 moves back to step 401 to perform a complete new beam alignment process (e.g., a complete new beam alignment process like the initial beam alignment process). Otherwise, the method 400 proceeds to step 409.

For example, assume that a relative position between the vehicle 123 and the endpoint 185 has changed significantly such that there would not be enough mmWave signal strength if a complete new mmWave link setup is not established. In this case, the method 400 moves back to step 401 to perform a complete new beam alignment process like the initial beam alignment process. In another example, assume that a change on the relative position between the vehicle 123 and the endpoint 185 is within a threshold such that a setup result of the previous mmWave link setup can still be used in a next mmWave link setup in order to save time. In this case, the method 400 proceeds to step 409.

At step 409, the link setup module 206 determines whether an mmWave link setup with limited beam training is needed. In some embodiments, the link setup module 206 determines whether an mmWave link setup with limited beam training is needed based on the set of mmWave-centric measurements. If the mmWave link setup with limited beam training is needed, the method proceeds to step 411. Otherwise, the method 400 proceeds to step 413.

For example, although a relative position between the vehicle 123 and the endpoint 185 has changed, there would still be enough mmWave signal strength if the mmWave link setup with limited beam training is established. In this case, the method 400 moves to step 411 to perform a limited beam alignment process. In another example, assume that a change on the relative position between the vehicle 123 and the endpoint 185 is negligible such that a setup result of the previous mmWave link setup can be used directly without adjustment in a next mmWave link setup. In this case, the method 400 proceeds to step 413.

At step 411, the link setup module 206 executes the limited beam alignment process to establish the mmWave link setup based on a setup result of the previous mmWave link setup.

At step 413, the data communication module 208 performs the additional mmWave communication process with the endpoint 185. For example, responsive to determining that no mmWave link setup is needed at both steps 407 and 409, the data communication module 208 performs the additional mmWave communication process with the endpoint 185 via the initial mmWave link established by the initial mmWave link setup. However, responsive to the mmWave link setup with limited training being established, the data communication module 208 performs the additional mmWave communication process with the endpoint 185 via an mmWave link established by the mmWave link setup with limited training.

In some embodiments, with respect to steps 407, 409 and 411, the link setup module 206 utilizes one or more of mmWave signal strengths, BSM data received from the endpoint 185 and local sensor data generated by onboard sensors (e.g., a GPS, mmWave radar, camera, LIDAR, etc.) to detect an environment change and determines a need to perform a limited beam alignment. For example, the link setup module 206 determines that an mmWave signal strength drops below a certain threshold or a relative position change between a transmitter on the vehicle 123 (or the endpoint 185) and a receiver on the endpoint 185 (or the vehicle 123) is nearly a beam width, etc. The link setup module 206 utilizes a result of the previous beam alignment for the beam re-alignment to reduce the number of beam pairs to be trained (e.g., only training a limited number of beam pairs around the selected beam pair obtained from the previous beam alignment process).

Figure 5A:
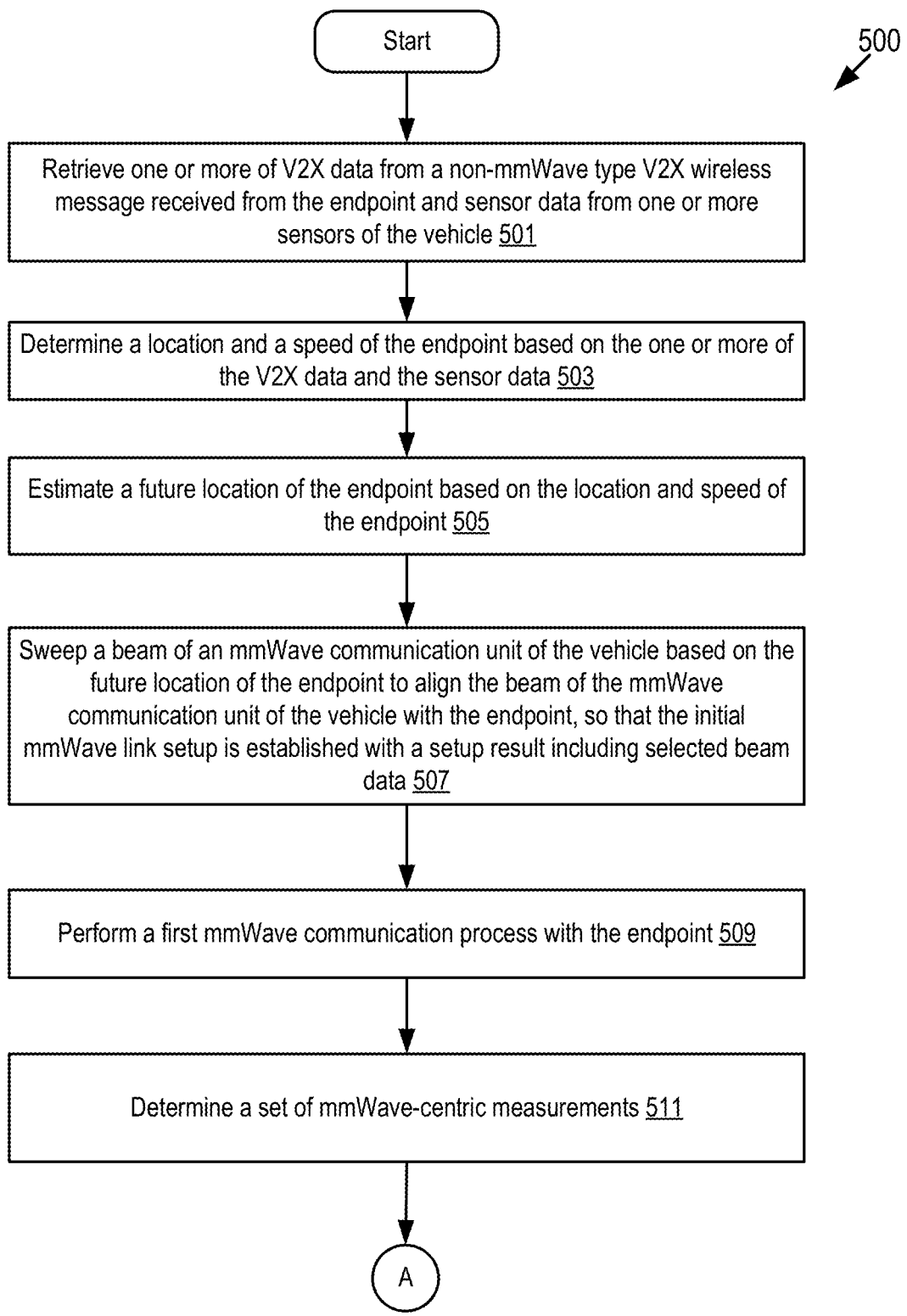
FIGS. 5A-5B depicts yet another method for providing efficient beam tracking for mmWave communication beam alignment according to some embodiments.
Figure 5B:
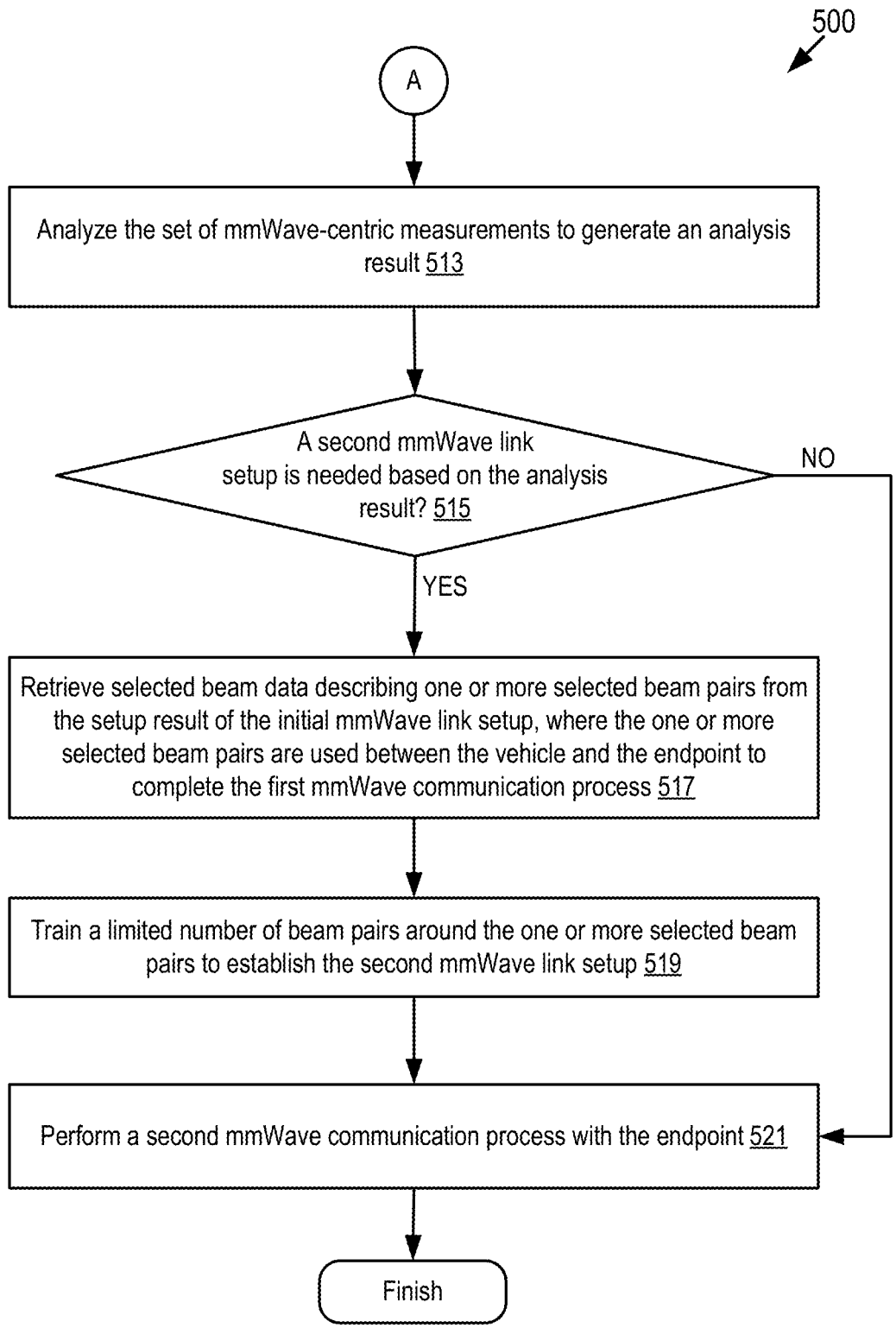

FIGS. 5A-5B depicts a method 500 for providing efficient beam tracking for mmWave communication beam alignment according to some embodiments. The steps of the method 500 are executable in any order, and not necessarily the order depicted in FIGS. 5A-5B.

Referring to step 5A, at step 501, the link setup module 206 retrieves one or more of V2X data from a non-mmWave type V2X wireless message received from the endpoint 185 and sensor data from one or more sensors of the vehicle 123.

At step 503, the link setup module 206 determines a location and a speed of the endpoint 185 based on the one or more of the V2X data and the sensor data.

At step 505, the link setup module 206 estimates a future location of the endpoint 185 based on the location and speed of the endpoint 185.

At step 507, the link setup module 206 sweeps a beam of an mmWave communication unit of the vehicle 123 based on the future location of the endpoint 185 to align the beam of the mmWave communication unit of the vehicle 123 with the endpoint 185, so that the initial mmWave link setup is established with a setup result including selected beam data.

At step 509, the data communication module 208 performs a first mmWave communication process with the endpoint 185 based on the setup result of the initial mmWave link setup. For example, the data communication module 208 causes the vehicle 123 to exchange data with the endpoint 185 using one or more selected beam pairs described by the selected beam data.

At step 511, the link setup module 206 determines a set of mmWave-centric measurements.

Referring to FIG. 5B, at step 513, the link setup module 206 analyzes the set of mmWave-centric measurements to generate an analysis result.

At step 515, the link setup module 206 determines whether a second mmWave link setup for a second mmWave communication process is needed based on the analysis result. Responsive to the second mmWave link setup is needed, the method 500 proceeds to step 517. Otherwise, the method 500 proceeds to step 521.

At step 517, the link setup module 206 retrieves selected beam data describing one or more selected beam pairs from the setup result of the initial mmWave link setup. The one or more selected beam pairs are used between the vehicle 123 and the endpoint 185 to complete the first mmWave communication process.

At step 519, the link setup module 206 trains a limited number of beam pairs around the one or more selected beam pairs to establish the second mmWave link setup.

At step 521, the data communication module 208 performs a second mmWave communication process with the endpoint 185.

Figure 6A:
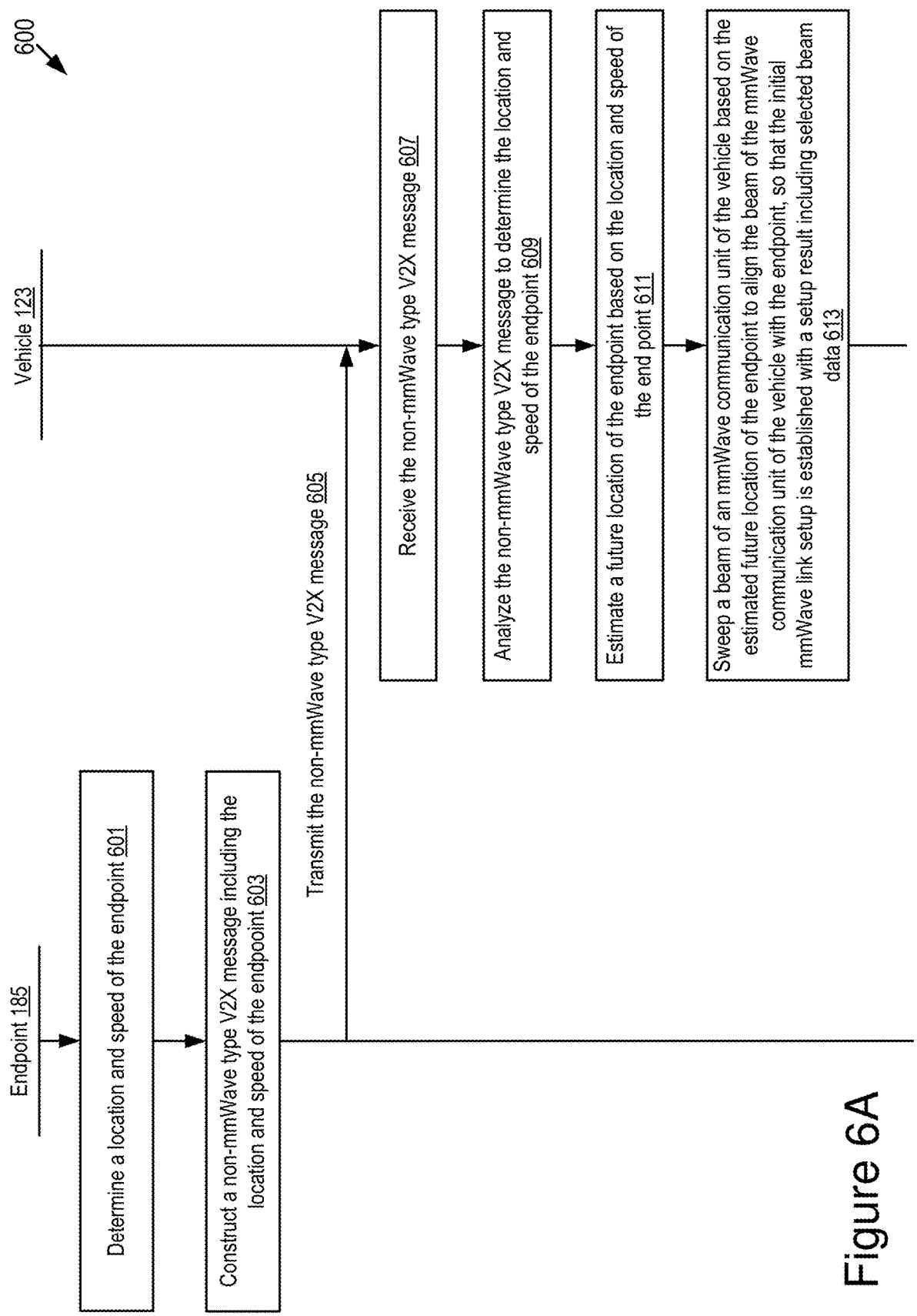
FIGS. 6A-6B depict an example process for providing efficient beam tracking for mmWave communication beam alignment according to some embodiments.
Figure 6B:
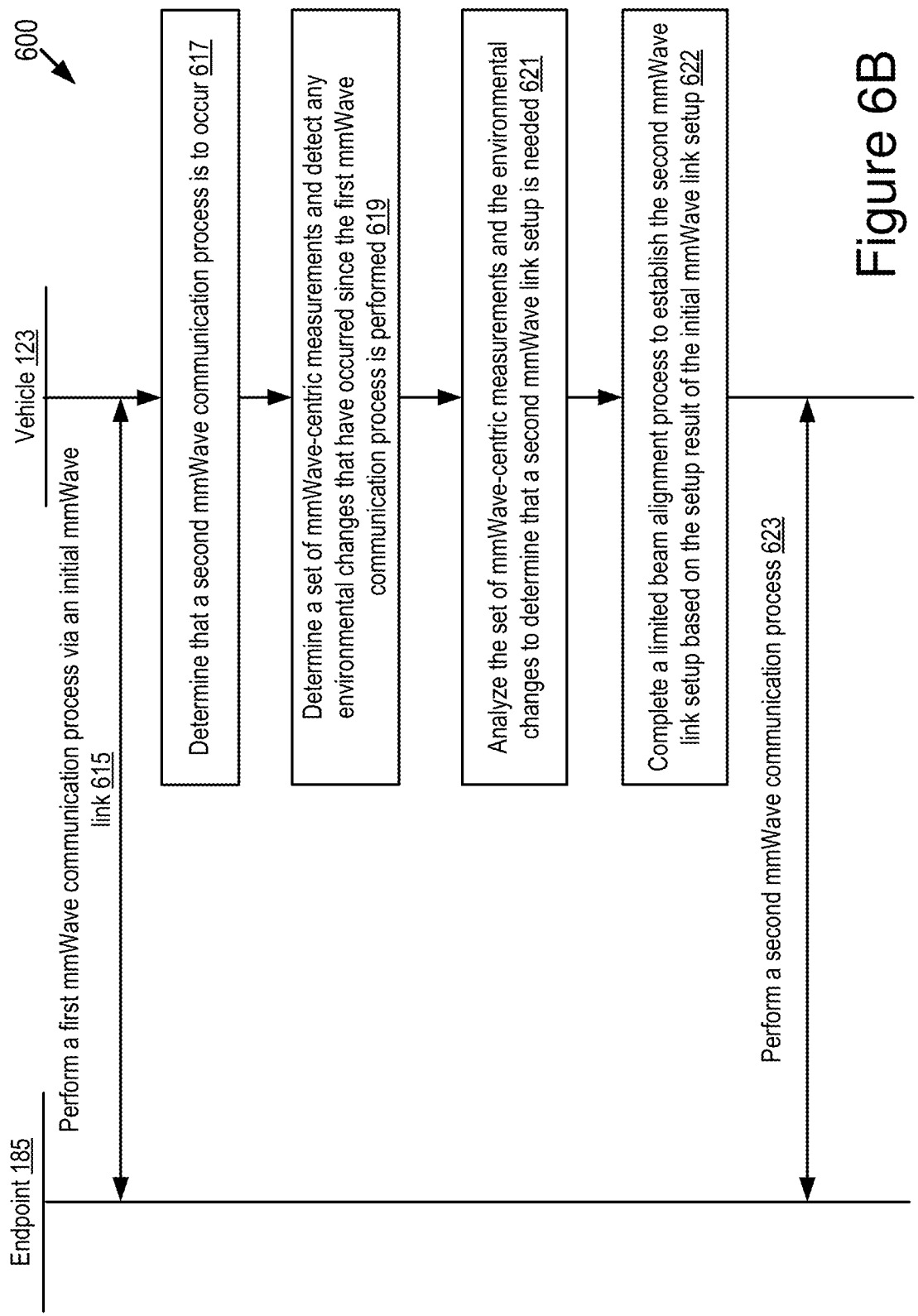

FIGS. 6A-6B depict an example process 600 for providing efficient beam tracking for mmWave communication beam alignment according to some embodiments. The steps of the process 600 are executable in any order, and not necessarily the order depicted in FIGS. 6A-6B.

In the example process 600, a prerequisite is that both the vehicle 123 and the endpoint 185 include both: (1) an mmWave communication capability (i.e., an mmWave communication channel); and (2) a non-mmWave type of V2X communication capabilities (i.e., a V2X communication channel that is not mmWave). As used herein, a non-mmWave type of V2X communication capability includes one of the following: DSRC; LTE-V2X; 5G-V2X; ITS-G5 in Europe; ITS-Connect; or some other type of V2X communication that does not include mmWave. In other words, the phrase "non-mmWave type of V2X communication" refers to any type of V2X communication that does not include mmWave.

In comparison, in an example process 700 described below with reference to FIGS. 7A-7B, the vehicle 123 and the endpoint 185 are only required to have an mmWave communication channel and not a second non-mmWave type of V2X communication channel in the example process 700.

Differences between the example process 600 and the example process 700 are summarized here. The example process 600 assumes that both the vehicle 123 and the other endpoint 185 include both an mmWave communication channel and a non-mmWave type of V2X communication channel. The example process 700 does not require that either the vehicle 123 or the endpoint 185 have a non-mmWave type of V2X communication channel, although they are both still required to have an mmWave communication channel.

The example process 600 executed by the beam alignment reduction system 199 is now introduced. Assume that the vehicle 123 that includes the beam alignment reduction system 199 needs to exchange a first mmWave communication with the endpoint 185. Both the vehicle 123 and the endpoint 185 include both an mmWave communication channel and a non-mmWave type V2X communication channel. The endpoint 185 can be another vehicle, an RSU or some other endpoint that has an mmWave communication channel and a non-mmWave type V2X communication channel. The beam alignment reduction system 199 executes an initial beam alignment process to complete the initial mmWave link setup. The beam alignment reduction system 199 then completes the first mmWave communication with the endpoint 185.

Now assume that a second mmWave communication is to occur. The beam alignment reduction system 199 captures a set of mmWave-centric measurements and analyzes these mmWave-centric measurements to determine if a second mmWave link setup is needed. If no second mmWave link setup is needed, then the beam alignment reduction system 199 initiates the second mmWave communication with the endpoint 185. If a second mmWave link setup is needed, then the beam alignment reduction system 199 executes a limited beam alignment process to setup a second mmWave link; this limited beam alignment process only sweeps the mmWave communication unit of the vehicle 123 around the one or more selected beam pairs that are previously used to complete the first mmWave communication and not each possible candidate beam pair as is done by existing solutions.

Referring to FIG. 6A, at step 601, the endpoint 185 determines a location and a speed of the endpoint based on sensor data recorded by one or more onboard sensors of the endpoint 185.

At step 603, the endpoint 185 constructs a non-mmWave type V2X message including data describing the location and the speed of the endpoint 185.

At step 605, the endpoint 185 transmits the non-mmWave type V2X message including data describing the location and speed of the endpoint 185. This message is of one of the following types: DSRC; LTE-V2X; 5G-V2X; ITS-G5 in Europe; ITS-Connect; or some other type of V2X communication that does not include mmWave. If this message is DSRC, then it is automatically transmitted every 100 ms per the DSRC protocol.

At step 607, the communication module 202 of the vehicle 123 receives the non-mmWave type V2X message.

At step 609, the link setup module 206 of the vehicle 123 analyzes the non-mmWave type V2X message to determine the location and the speed of the endpoint 185.

At step 611, the link setup module 206 of the vehicle 123 estimates a future location of the endpoint 185 based on the location and the speed of the endpoint 185 as described in the non-mmWave type V2X message.

At step 613, the link setup module 206 of the vehicle 123 sweeps a beam of an mmWave communication unit of the vehicle 123 based on the estimated future location of the endpoint 185. This sweeping aligns the beam of the mmWave communication unit of the vehicle 123 with the endpoint 185, thereby establishing the initial mmWave link setup with a setup result including selected beam data. That is, a result of this sweeping is selected beam data. The selected beam data is digital data that describes one or more selected beam pairs that are used between the vehicle 123 and the endpoint 185 to complete a first mmWave communication; this digital data may be utilized for any second mmWave communications that occur with this same endpoint 185 (e.g., see steps 621 and 623 below where this digital data is used for this purpose). The alignment achieved by the initial mmWave link setup may be within a margin of error that is sufficient to ensure a successful communication from a transmitter located in the vehicle 123 (or the endpoint 185) to a receiver located in the endpoint 185 (or the vehicle 123) via mmWave communication. Steps 607-613 constitute the initial beam alignment process.

Referring to FIG. 6B, at step 615, the data communication module 208 of the vehicle 123 performs a first mmWave communication process with the endpoint 185. For example, the data communication module 208 causes a transmitter in the vehicle 123 to transmit a first mmWave communication to a receiver located in the endpoint 185.

The link setup module 206 determines whether a second mmWave communication process is to occur. If the link setup module 206 determines that a second mmWave communication is to occur at step 617, then the process 600 proceeds to step 619. If not, then the process 600 ends.

At step 619, the link setup module 206 of the vehicle 123 determines a set of mmWave-centric measurements and detects any environmental changes that have occurred since the first mmWave communication process is performed at step 615. For example, the link setup module 206 performs one or more of the following operations: (a) measuring an mmWave signal strength for an initial mmWave link established by the initial mmWave link setup; (b) determining how far the endpoint 185 has traveled based on path history information included in BSMs received from the endpoint 185; and (c) determining how far the endpoint 185 has traveled based on local sensor data recorded by sensors such as onboard cameras, radar, LIDAR and range finders of the vehicle 123.

The link setup module 206 of the vehicle 123 analyzes the set of mmWave-centric measurements to determine whether a second mmWave link setup is needed. If a second mmWave link setup is not needed, then the process 600 proceeds to step 623. If a second mmWave link setup is needed (e.g., at step 621, the link setup module 206 of the vehicle 123 analyzes the set of mmWave-centric measurements to determine that a second mmWave link setup is needed), then the process 600 proceeds to step 622. Steps 619 and 621 constitute a process for determining whether a second mmWave link setup is needed in order to complete a second mmWave communication with the same endpoint 185 that was previously communicated with the vehicle 123 via mmWave communication.

At step 622, the link setup module 206 completes a limited beam alignment process to establish the second mmWave link setup based on the setup result of the initial mmWave link setup. For example, the link setup module 206 completes the limited beam alignment process by: (1) retrieving the selected beam data that describes one or more selected beam pairs that are used between the vehicle 123 and the endpoint 185 to complete the first mmWave communication process; and (2) training a limited number of beam pairs around the one or more selected beam pairs that are obtained from the first mmWave link setup. For example, the link setup module 206 only sweeps the beam of the vehicle's mmWave communication unit around the beam pairs that were previously used for the first mmWave communication process, thereby establishing a second mmWave communication link using the limited beam alignment process.

At step 623, the data communication module 208 of the vehicle 123 performs a second mmWave communication process. For example, if a second mmWave link setup is not needed, then the link setup module 206 of the vehicle 123 completes the second mmWave communication process with the endpoint 185 via an initial mmWave link established by the initial mmWave link setup (without setting up a second mmWave link). If a second mmWave link setup is established, then the link setup module 206 of the vehicle 123 completes the second mmWave communication process with the endpoint 185 via a second mmWave communication link established by the second mmWave link setup.

Figure 7A:
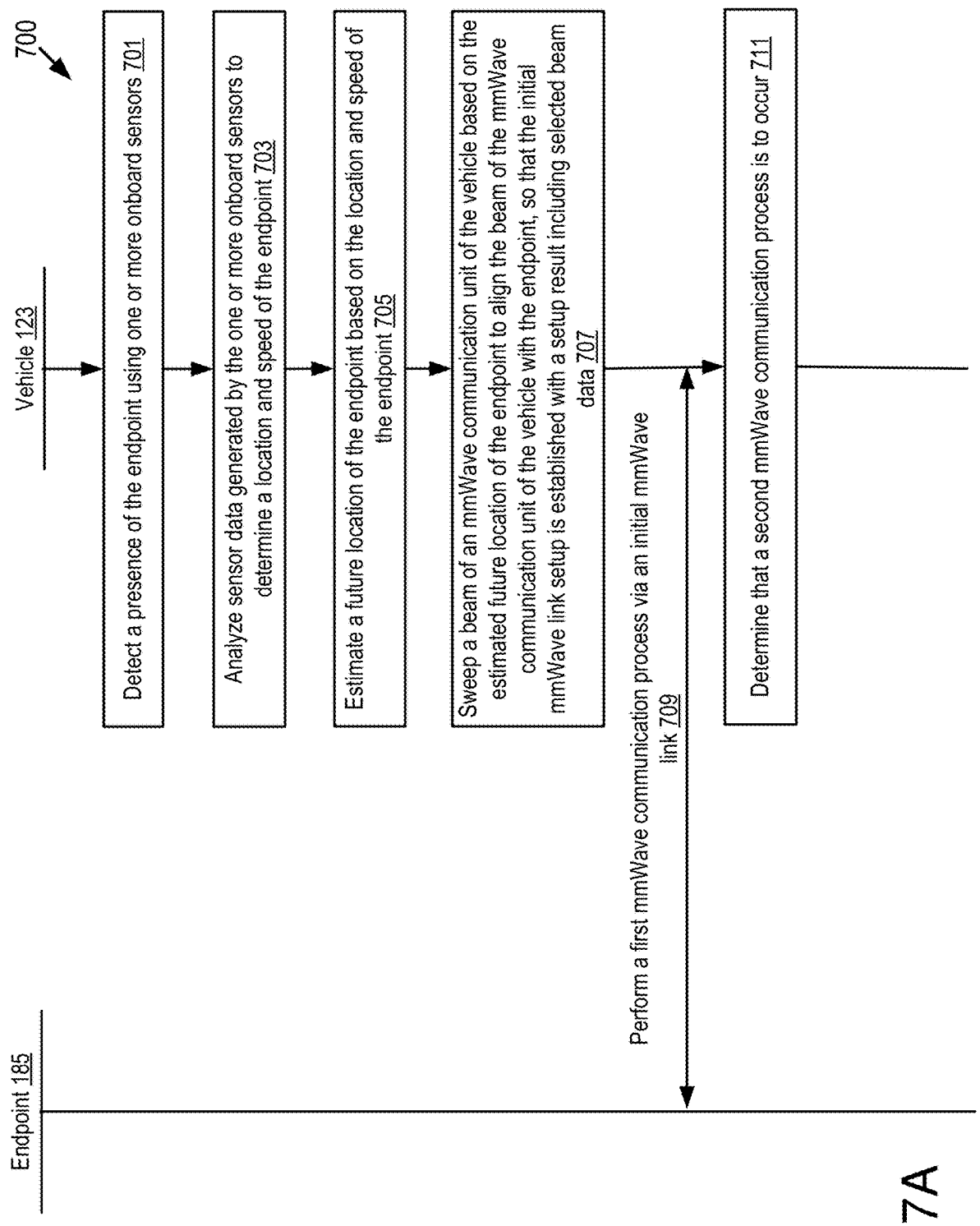
FIGS. 7A-7B depict another example process for providing efficient beam tracking for mmWave communication beam alignment according to some embodiments.
Figure 7B:
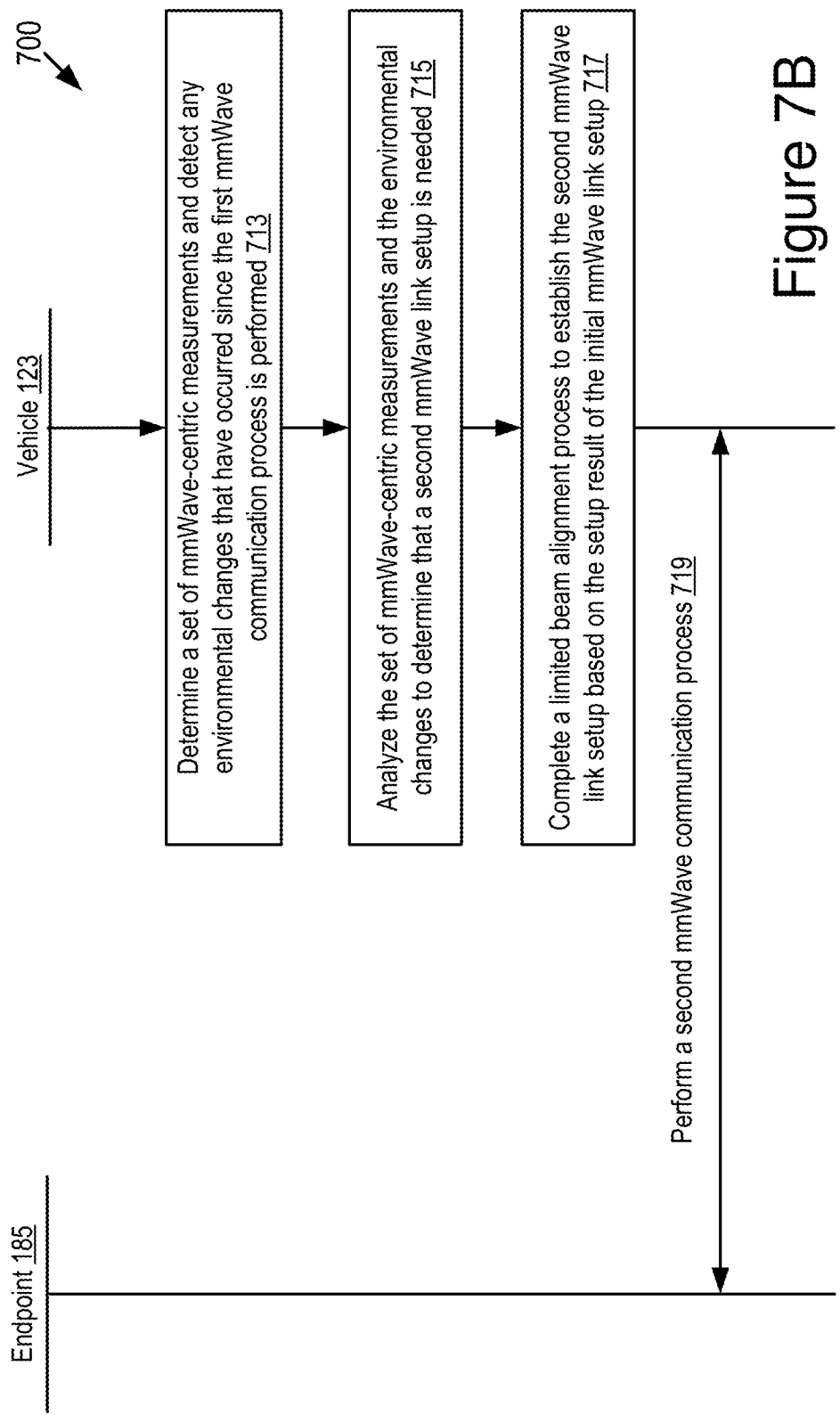

FIGS. 7A-7B depict another example process 700 for providing efficient beam tracking for mmWave communication beam alignment according to some embodiments. The steps of the process 700 are executable in any order, and not necessarily the order depicted in FIGS. 7A-7B. In the process 700, a non-mmWave type V2X communication channel is not required for the vehicle 123 or the endpoint 185.

Referring to FIG. 7A, at step 701, the link setup module 206 of the vehicle 123 detects a presence of the endpoint 185 using one or more onboard sensors such as radar, LIDAR, or camera. The endpoint 185 may optionally be monitored at two points so that a speed of the endpoint 185 may be determined.

At step 703, the link setup module 206 of the vehicle 123 analyzes the sensor data to determine a location and a speed of the endpoint 185.

At step 705, the link setup module 206 of the vehicle 123 estimates a future location of the endpoint 185 based on the location and speed of the endpoint 185 as described in the sensor data.

At step 707, the link setup module 206 of the vehicle 123 sweeps a beam of an mmWave communication unit of the vehicle 123 based on the estimated future location of the endpoint 185 to align the beam of the mmWave communication unit of the vehicle 123 with the endpoint 185, so that an initial mmWave link setup is established with a setup result including selected beam data. For example, operations similar to those described above at step 613 of FIG. 6A can be performed at step 707. Steps 701-707 constitute the initial beam alignment process.

At step 709, the data communication module 208 of the vehicle 123 performs a first mmWave communication process with the endpoint 185.

The link setup module 206 determines whether a second mmWave communication process is to occur. If the link setup module 206 determines that a second mmWave communication is to occur at step 711, then the process 700 proceeds to step 713. If not, then the process 700 ends.

Referring to FIG. 7B, at step 713, the link setup module 206 of the vehicle 123 determines a set of mmWave-centric measurements and detects any environmental changes that have occurred since the first mmWave communication process is performed at step 709. For example, operations similar to those described above at step 619 of FIG. 6B can be performed at step 713.

The link setup module 206 of the vehicle 123 analyzes the set of mmWave-centric measurements to determine whether a second mmWave link setup is needed. If a second mmWave link setup is not needed, then the process 700 proceeds to step 719. If a second mmWave link setup is needed (e.g., at step 715, the link setup module 206 of the vehicle 123 analyzes the set of mmWave-centric measurements to determine that a second mmWave link setup is needed), then the process 700 proceeds to step 717. Steps 713-715 constitute a process for determining whether a second mmWave link setup is needed in order to complete a second mmWave communication with the same endpoint 185 that was previously communicated with the vehicle 123 via mmWave communication.

At step 717, the link setup module 206 completes a limited beam alignment process to establish the second mmWave link setup based on the setup result of the initial mmWave link setup. For example, operations similar to those described above at step 622 of FIG. 6B can be performed at step 717.

At step 719, the data communication module 208 of the vehicle 123 performs a second mmWave communication process. For example, operations similar to those described above at step 623 of FIG. 6B can be performed at step 719.

Figure 8A:
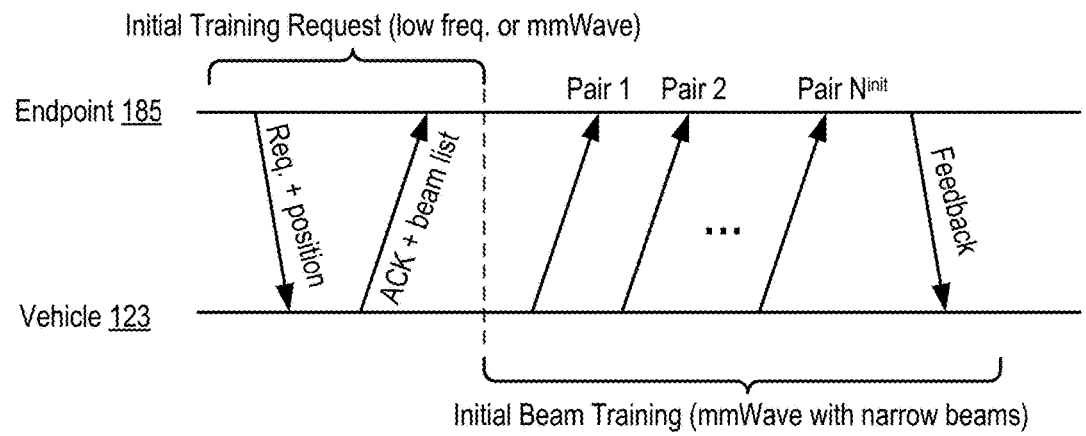
FIG. 8A is a graphical representation illustrating an example process for executing an initial beam alignment process according to some embodiments.

FIG. 8A is a graphical representation illustrating an example process for executing an initial beam alignment process according to some embodiments. The initial beam alignment process includes an initial training request phase and an initial beam training phase.

In the initial training request phase, the endpoint 185 sends a message including a request for beam training and a position of the endpoint 185 to the vehicle 123. Responsive to receiving the request for beam training, the beam alignment reduction system 199 of the vehicle 123 selects an initial endpoint-side beam list and an initial vehicle-side beam list based on the position of the vehicle 123 and the position of the endpoint 185. The beam alignment reduction system 199 of the vehicle 123 sends a message including one or more of an acknowledgement (ACK) for the request, the initial endpoint-side beam list, and the initial vehicle-side beam list to the endpoint 185.

The initial endpoint-side beam list includes one or more endpoint-side beam lobes used on a side of the endpoint 185 for initial beam training. The initial vehicle-side beam list includes one or more vehicle-side beam lobes used on a side of the vehicle 123 for initial beam training. The initial endpoint-side beam list and the initial vehicle-side beam list form $N^{init}$ beam pairs, with each beam pair including one endpoint-side beam lobe and one vehicle-side beam lobe.

In the initial beam training phase, the beam alignment reduction system 199 of the vehicle 123 conducts beam training with the endpoint 185 from a first beam pair "Pair 1" to an $(N^{init})^{th}$ beam pair "Pair $N^{init}$" respectively and receives feedback data from the endpoint 185. The beam alignment reduction system 199 determines one or more selected beam pairs based on the feedback data. For example, the beam alignment reduction system 199 selects one or more beam pairs that have strongest mmWave signal strengths as the selected beam pairs.

Figure 8B:
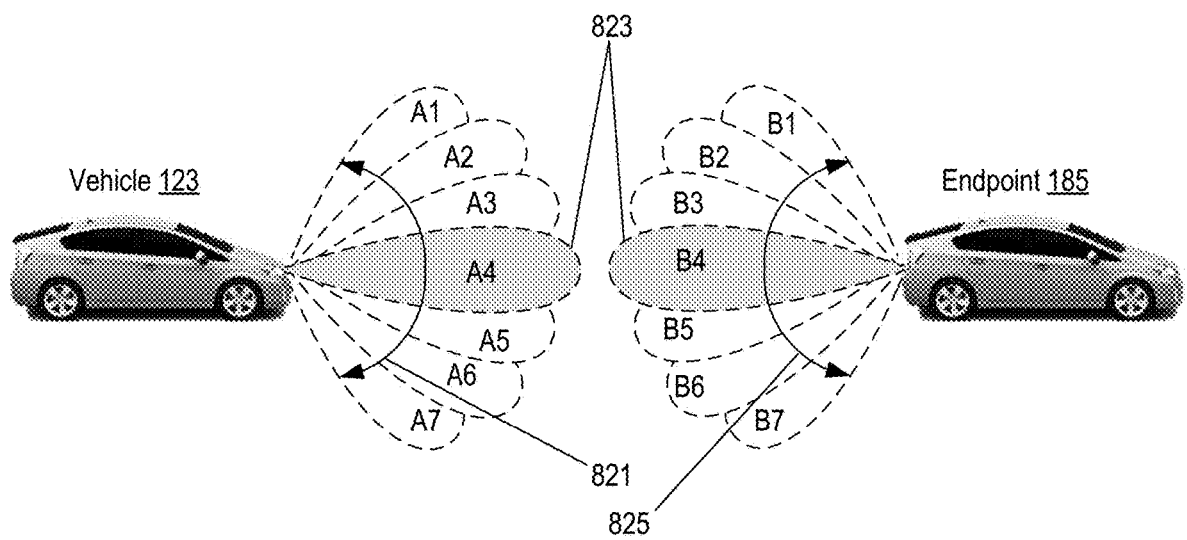
FIG. 8B is a graphical representation illustrating example beam lobes trained in an initial beam alignment process according to some embodiments.

FIG. 8B is a graphical representation illustrating example beam lobes trained in an initial beam alignment process according to some embodiments. For example, the beam alignment reduction system 199 of the vehicle 123 selects an initial endpoint-side beam list 825 including beam lobes B1-B7 and an initial vehicle-side beam list 821 including beam lobes A1-A7. A total number of beam pairs trained in the initial beam alignment process is $N^{init}=7*7=49$, including (A1, B1), (A1, B2), (A1, B3), . . . , (A1, B7), (A2, B1), (A2, B2), (A2, B3), . . . , (A2, B7), . . . , (A7, B1), (A7, B2), (A7, B3), . . . , (A7, B7). After the initial beam training, the beam alignment reduction system 199 determines a selected beam pair 823 including a vehicle-side beam lobe A4 and an endpoint-side beam lobe B4 for performing a first communication process. For example, the selected beam pair 823 has a strongest mmWave signal strength among the above 49 beam pairs.

Figure 8C:
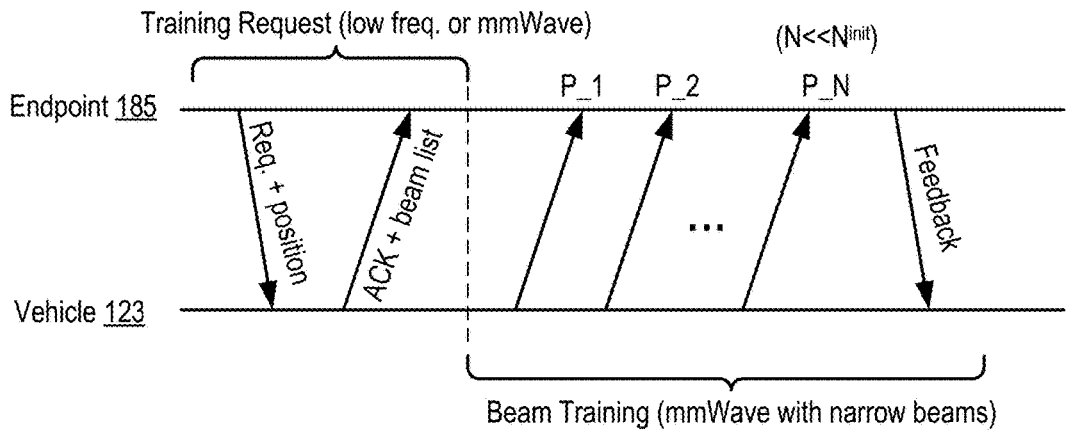
FIG. 8C is a graphical representation illustrating an example process for executing a limited beam alignment process according to some embodiments.
Figure 8D:
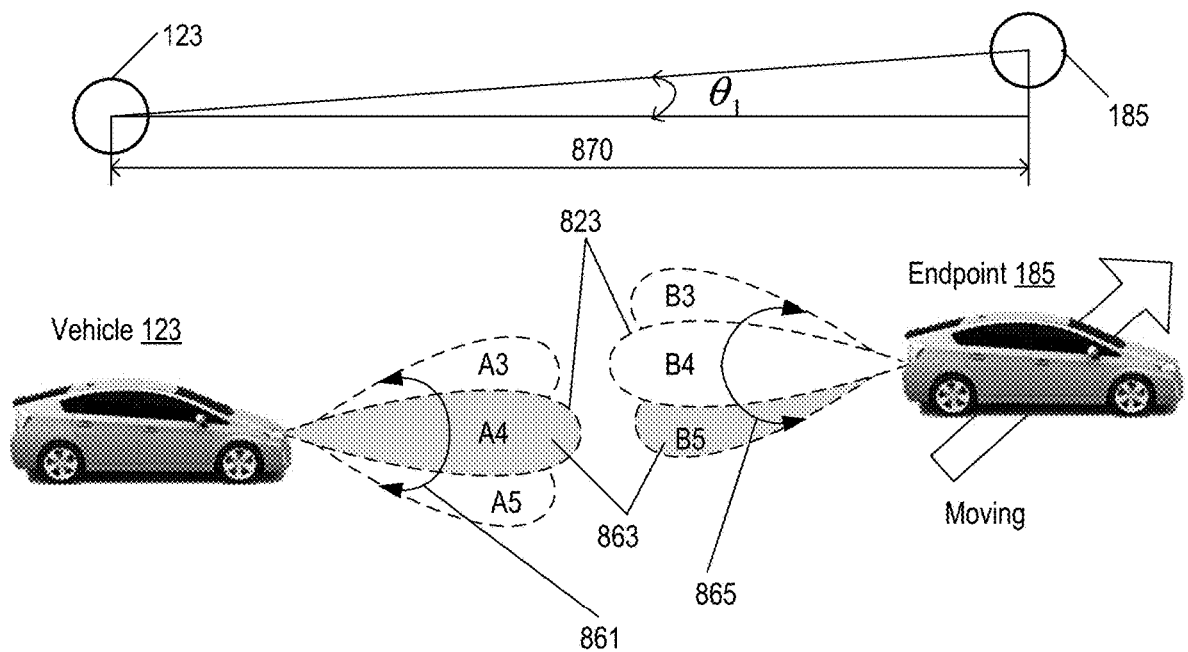
FIG. 8D is a graphical representation illustrating example beam lobes trained in a limited beam alignment process according to some embodiments.
Figure 8E:
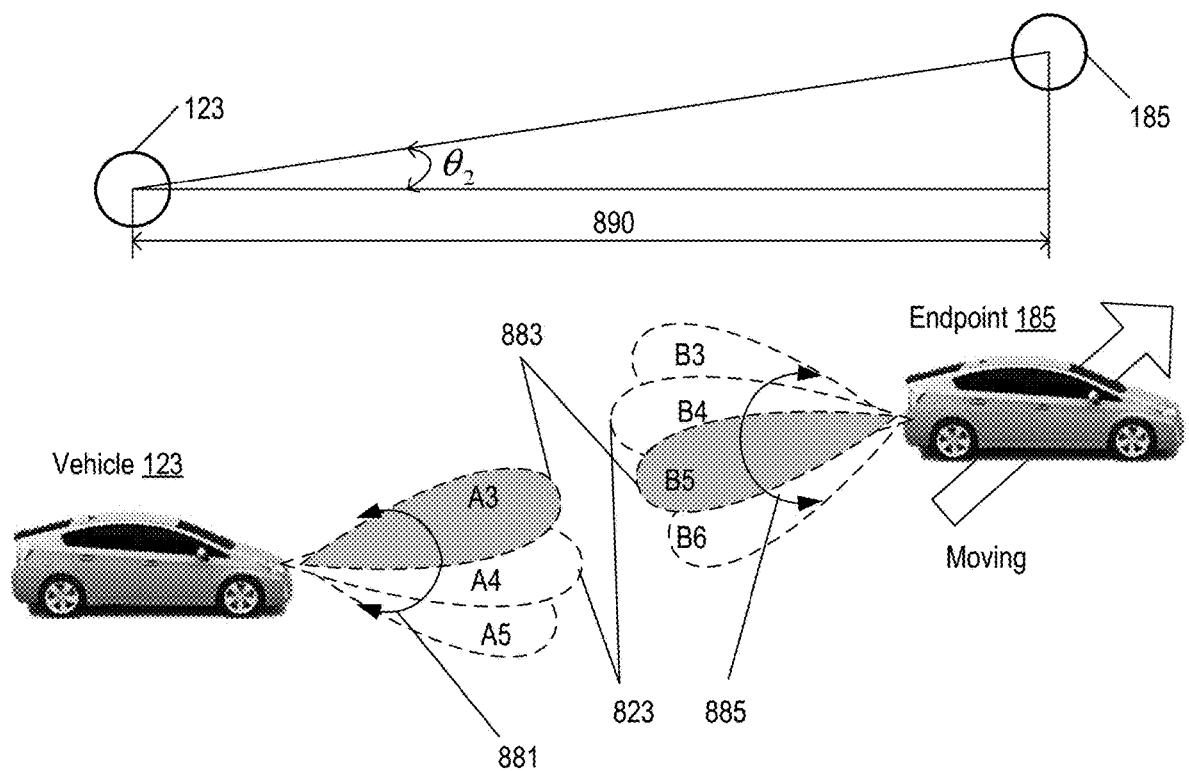
FIG. 8E is a graphical representation illustrating example beam lobes trained in a limited beam alignment process according to some embodiments.

FIG. 8C is a graphical representation illustrating an example process for executing a limited beam alignment process according to some embodiments. The limited beam alignment process includes a training request phase and a beam training phase.

In the training request phase, the endpoint 185 sends a message including a request for beam training and a position of the endpoint 185 to the vehicle 123. Responsive to receiving the request for beam training, the beam alignment reduction system 199 of the vehicle 123 selects an endpoint-side beam list and a vehicle-side beam list based on a result of the initial beam alignment process. The beam alignment reduction system 199 of the vehicle 123 sends a message including one or more of an acknowledgement (ACK) for the request, the endpoint-side beam list, and the vehicle-side beam list to the endpoint 185.

The endpoint-side beam list includes one or more endpoint-side beam lobes used on a side of the endpoint 185 for the limited beam training. The vehicle-side beam list includes one or more vehicle-side beam lobes used on a side of the vehicle 123 for the limited beam training. The endpoint-side beam list and the vehicle-side beam list form N beam pairs, where N and $N^{init}$ are positive integers, and $N \ll N^{init}$.

In the beam training phase, the beam alignment reduction system 199 of the vehicle 123 conducts the limited beam training with the endpoint 185 from a first beam pair "P_1" to an $N^{th}$ beam pair "P_N" respectively and receives feedback data from the endpoint 185. The beam alignment reduction system 199 determines one or more beam pairs based on the feedback data. For example, the beam alignment reduction system 199 selects one or more beam pairs that have strongest mmWave signal strengths.

FIG. 8D is a graphical representation illustrating example beam lobes trained in a limited beam alignment process according to some embodiments. For example, assume that the endpoint 185 has changed to another lane when compared to FIG. 8B. A relative position between the vehicle 123 and the endpoint 185 is shown in FIG. 8D with a distance 870 and a relative angle $\theta_1$. The beam alignment reduction system 199 of the vehicle 123 selects an endpoint-side beam list 865 including beam lobes B3-B5, where the beam lobe B4 is a selected endpoint-side beam lobe in the selected beam pair 823 and the beam lobes B3 and B5 are two endpoint-side beam lobes adjacent to the selected endpoint-side beam lobe B4. The beam alignment reduction system 199 of the vehicle 123 selects a vehicle-side beam list 861 including beam lobes A3-A4, where the beam lobe A4 is a selected vehicle-side beam lobe in the selected beam pair 823 and the beam lobes A3 and A5 are two vehicle-side beam lobes adjacent to the selected vehicle-side beam lobe A4. A total number of beam pairs trained in the limited beam alignment process is N=3*3=9, including (A3, B3), (A3, B4), (A3, B5), (A4, B3), (A4, B4), (A4, B5), (A5, B3), (A5, B4) and (A5, B5). After performing the limited beam training, the beam alignment reduction system 199 determines a selected beam pair 863 including the vehicle-side beam lobe A4 and the endpoint-side beam lobe B5 for performing a second communication process. For example, the selected beam pair 863 has a strongest mmWave signal strength among the above 9 beam pairs.

FIG. 8E is a graphical representation illustrating example beam lobes trained in a limited beam alignment process according to some embodiments. The endpoint 185 has moved upwards when compared to FIG. 8B. A relative position between the vehicle 123 and the endpoint 185 is shown with a distance 890 and a relative angle $\theta_2$. A change on the relative position between the vehicle 123 and the endpoint 185 in FIG. 8E is greater than that in FIG. 8D (e.g., $\theta_1 < \theta_2$). The beam alignment reduction system 199 of the vehicle 123 selects an endpoint-side beam list 885 including beam lobes B3-B6 and a vehicle-side beam list 881 including beam lobes A3-A5 based on the relative position between the vehicle 123 and the endpoint 185 (e.g., the distance 890 and the relative angle $\theta_2$ between the vehicle 123 and the endpoint 185).

The beam lobe B4 is the selected endpoint-side beam lobe in the selected beam pair 823, and the beam lobes B3, B5 and B6 are three endpoint-side beam lobes around (e.g., next to) the selected endpoint-side beam lobe B4. Because the endpoint 185 moves upwards, two beam lobes B5 and B6 below the selected endpoint-side beam lobe B4 are included in the endpoint-side beam list 885 while only one beam lobe B3 above the selected endpoint-side beam lobe B4 is included in the endpoint-side beam list 885.

The beam lobe A4 is the selected vehicle-side beam lobe in the selected beam pair 823, and the beam lobes A3 and A5 are two vehicle-side beam lobes around (e.g., adjacent to) the selected vehicle-side beam lobe A4.

A total number of beam pairs trained in the limited beam alignment process is N=3*4=12, including (A3, B3), (A3, B4), (A3, B5), (A3, B6), (A4, B3), (A4, B4), (A4, B5), (A4, B6), (A5, B3), (A5, B4), (A5, B5) and (A5, B6). After performing the limited beam training, the beam alignment reduction system 199 determines a selected beam pair 883 including the vehicle-side beam lobe A3 and the endpoint-side beam lobe B5 for performing a second communication process. For example, the selected beam pair 883 has a strongest mmWave signal strength among the above 12 beam pairs.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method for a vehicle, comprising:
   executing an initial beam alignment process to establish an initial millimeter wave (mmWave) link setup with an endpoint so that a first mmWave communication process is performed with the endpoint;
   determining whether a second mmWave link setup is needed to perform a second mmWave communication process with the endpoint;
   responsive to determining that the second mmWave link setup is needed, executing a limited beam alignment process to establish the second mmWave link setup so that an amount of time needed to establish the second mmWave link setup is minimized; and
   responsive to determining that the second mmWave link setup is not needed, performing the second mmWave communication process with the endpoint without establishing the second mmWave link setup so that the amount of time needed to establish the second mmWave link setup is saved.

2. The method of claim 1, wherein determining that the second mmWave link setup is not needed comprises:
   receiving sensor data from the endpoint that describes a position of the endpoint;
   determining that a change in a relative position between the vehicle and the endpoint exceeds a first position threshold, but is within a second position threshold; and
   adjusting the initial mmWave link setup using a limited beam alignment process.

3. The method of claim 1, wherein determining whether the second mmWave link setup is needed is based on a set of mmWave-centric measurements.

4. The method of claim 3, wherein determining whether the second mmWave link setup is needed based on the set of mmWave-centric measurements further comprises:
   determining the set of mmWave-centric measurements since the first mmWave communication process is performed;
   analyzing the set of mmWave-centric measurements to generate an analysis result; and
   determining whether the second mmWave link setup is needed based on the analysis result.

5. The method of claim 4, wherein the set of mmWave-centric measurements includes one or more of: an mmWave signal strength associated with the initial mmWave link setup; a distance that the endpoint has traveled since the first mmWave communication process is performed; a speed of the endpoint; or a change on a relative position between the vehicle and the endpoint.

6. The method of claim 1, wherein executing the limited beam alignment process to establish the second mmWave link setup further comprises:
completing the limited beam alignment process based on a setup result of the initial mmWave link setup so that the amount of time needed to establish the second mmWave link setup is substantially reduced compared to an amount of time needed to establish the initial mmWave link setup.

7. The method of claim 6, wherein completing the limited beam alignment process based on the setup result of the initial mmWave link setup further comprises:
retrieving selected beam data describing one or more selected beam pairs from the setup result of the initial mmWave link setup, wherein the one or more selected beam pairs are used between the vehicle and the endpoint to complete the first mmWave communication process; and
training a limited number of beam pairs around the one or more selected beam pairs to establish the second mmWave link setup.

8. The method of claim 7, wherein:
each of the one or more selected beam pairs includes a selected vehicle-side beam lobe and a selected endpoint-side beam lobe;
the limited number of beam pairs includes beam pairs formed by a list of vehicle-side beam lobes and a list of endpoint-side beam lobes;
the list of vehicle-side beam lobes includes the selected vehicle-side beam lobe and one or more vehicle-side beam lobes next to the selected vehicle-side beam lobe; and
the list of the endpoint-side beam lobes includes the selected endpoint-side beam lobe and one or more endpoint-side beam lobes next to the selected endpoint-side beam lobe.

9. The method of claim 7, wherein a total number of beam pairs in the limited number of beam pairs is less than a total number of beam pairs trained during the initial mmWave link setup.

10. The method of claim 1, wherein executing the initial beam alignment process to establish the initial mmWave link setup with the endpoint further comprises:
retrieving one or more of Vehicle-to-Everything (V2X) data from a non-mmWave type V2X wireless message received from the endpoint and sensor data from one or more sensors of the vehicle; and
executing the initial beam alignment process based on the one or more of the V2X data and the sensor data.

11. The method of claim 10, wherein executing the initial beam alignment process based on the one or more of the V2X data and the sensor data further comprises:
determining a location and a speed of the endpoint based on the one or more of the V2X data and the sensor data;
estimating a future location of the endpoint based on the location and the speed of the endpoint; and
sweeping a beam of an mmWave communication unit of the vehicle based on the future location of the endpoint to align the beam of the mmWave communication unit of the vehicle with the endpoint so that the initial mmWave link setup is established, wherein a setup result of the initial mmWave link setup includes selected beam data describing one or more selected beam pairs.

12. A system comprising:
an onboard vehicle computer system including a non-transitory memory storing computer code which, when executed by the onboard vehicle computer system, causes the onboard vehicle computer system to:
execute an initial beam alignment process to establish an initial millimeter wave (mmWave) link setup with an endpoint so that a first mmWave communication process is performed with the endpoint;
determine whether a second mmWave link setup is needed to perform a second mmWave communication process with the endpoint;
responsive to determining that the second mmWave link setup is needed, execute a limited beam alignment process to establish the second mmWave link setup so that an amount of time needed to establish the second mmWave link setup is minimized; and
responsive to determining that the second mmWave link setup is not needed, performing the second mmWave communication process with the endpoint without establishing the second mmWave link setup so that the amount of time needed to establish the second mmWave link setup is saved.

13. The system of claim 12, wherein determining that the second mmWave link setup is not needed comprises:
receiving sensor data from the endpoint that describes a position of the endpoint;
determining that a change in a relative position between the vehicle and the endpoint exceeds a first position threshold, but is within a second position threshold; and
adjusting the initial mmWave link setup using a limited beam alignment process.

14. The system of claim 12, wherein the computer code which, when executed by the onboard vehicle computer system, causes the onboard vehicle computer system to determine whether the second mmWave link setup is needed at least by:
determining a set of mmWave-centric measurements since the first mmWave communication process is performed;
analyzing the set of mmWave-centric measurements to generate an analysis result; and
determining whether the second mmWave link setup is needed based on the analysis result.

15. The system of claim 14, wherein the set of mmWave-centric measurements includes one or more of: an mmWave signal strength associated with the initial mmWave link setup; a distance that the endpoint has traveled since the first mmWave communication process is performed; a speed of the endpoint; or a change on a relative position between the vehicle and the endpoint.

16. The system of claim 12, wherein the computer code which, when executed by the onboard vehicle computer system, causes the onboard vehicle computer system to execute the limited beam alignment process at least by:
completing the limited beam alignment process based on a setup result of the initial mmWave link setup so that the amount of time needed to establish the second mmWave link setup is substantially reduced compared to an amount of time needed to establish the initial mmWave link setup.

17. The system of claim 16, wherein the computer code which, when executed by the onboard vehicle computer system, causes the onboard vehicle computer system to complete the limited beam alignment process based on the setup result of the initial mmWave link setup at least by:

retrieving selected beam data describing one or more selected beam pairs from the setup result of the initial mmWave link setup, wherein the one or more selected beam pairs are used between the vehicle and the endpoint to complete the first mmWave communication process; and training a limited number of beam pairs around the one or more selected beam pairs to establish the second mmWave link setup.

18. The system of claim 17, wherein:

each of the one or more selected beam pairs includes a selected vehicle-side beam lobe and a selected endpoint-side beam lobe;

the limited number of beam pairs includes beam pairs formed by a list of vehicle-side beam lobes and a list of endpoint-side beam lobes;

the list of vehicle-side beam lobes includes the selected vehicle-side beam lobe and one or more vehicle-side beam lobes next to the selected vehicle-side beam lobe; and the list of the endpoint-side beam lobes includes the selected endpoint-side beam lobe and one or more endpoint-side beam lobes next to the selected endpoint-side beam lobe.

19. A computer program product comprising a non-transitory memory of an onboard vehicle computer system of a vehicle storing computer-executable code that, when executed by a processor, causes the processor to:

execute an initial beam alignment process to establish an initial millimeter wave (mmWave) link setup with an endpoint so that a first mmWave communication process is performed with the endpoint;

determine whether a second mmWave link setup is needed to perform a second mmWave communication process with the endpoint;

responsive to determining that the second mmWave link setup is needed, execute a limited beam alignment process to establish the second mmWave link setup so that an amount of time needed to establish the second mmWave link setup is minimized; and responsive to determining that the second mmWave link setup is not needed, perform the second mmWave communication process with the endpoint without establishing the second mmWave link setup so that the amount of time needed to establish the second mmWave link setup is saved.

20. The computer program product of claim 19, wherein determining that the second mmWave link setup is not needed comprises:

receiving sensor data from the endpoint that describes a position of the endpoint;

determining that a change in a relative position between the vehicle and the endpoint exceeds a first position threshold, but is within a second position threshold; and adjusting the initial mmWave link setup using a limited beam alignment process.

\* \* \* \* \*